US010797860B1

(12) United States Patent
Dennis

(10) Patent No.: US 10,797,860 B1
(45) Date of Patent: Oct. 6, 2020

(54) BLOCKCHAIN BASED COLD EMAIL DELIVERY

(71) Applicant: Turing Technology, Inc., Redwood City, CA (US)

(72) Inventor: Stewart MacGregor Dennis, Redwood City, CA (US)

(73) Assignee: TURING TECHNOLOGY, INC., Redwood City, CA (US)

( * ) Notice: Subject to any disclaimer, the term of this patent is extended or adjusted under 35 U.S.C. 154(b) by 504 days.

(21) Appl. No.: 15/845,895

(22) Filed: Dec. 18, 2017

Related U.S. Application Data

(60) Provisional application No. 62/535,910, filed on Jul. 23, 2017.

(51) Int. Cl.

| | |
|---|---|
| *H04L 9/14* | (2006.01) |
| *H04L 9/32* | (2006.01) |
| *H04L 12/14* | (2006.01) |
| *G06F 16/27* | (2019.01) |
| *G06F 21/00* | (2013.01) |
| *G06F 21/30* | (2013.01) |
| *G06F 21/62* | (2013.01) |
| *G06F 21/64* | (2013.01) |

(Continued)

(52) U.S. Cl.
CPC .............. *H04L 9/0637* (2013.01); *H04L 9/14* (2013.01); *H04L 9/30* (2013.01); *H04L 9/3247* (2013.01); *H04L 51/28* (2013.01)

(58) Field of Classification Search
CPC ... H04L 9/14; H04L 9/32; H04L 12/14; H04L 51/02; H04L 51/04; H04L 51/16; H04L 51/22; H04L 63/00; H04L 63/08; H04L 63/10; H04L 63/20; H04L 67/00; H04L 67/10; H04L 67/12; H04L 67/20; H04L 67/22; H04L 67/32; H04L 69/22; G06F 16/27; G06F 21/00; G06F 21/30; G06F 21/62; G06F 21/64
See application file for complete search history.

(56) References Cited

U.S. PATENT DOCUMENTS

| | | | |
|---|---|---|---|
| 7,783,883 | B2 | 8/2010 | Gasparini et al. |
| 10,122,661 | B2 | 11/2018 | Golan |

(Continued)

OTHER PUBLICATIONS

Nakamoto, "Bitcoin: A Peer-to-Peer Electronic Cash System," www.bitcoin.org, Oct. 31, 2008, 9 pages.

(Continued)

*Primary Examiner* — Alexander Lagor
*Assistant Examiner* — Kalish K Bell
(74) *Attorney, Agent, or Firm* — Haynes Beffel & Wolfeld LLP

(57) ABSTRACT

Systems and techniques are provided for managing and categorizing unsolicited emails from unknown senders using blockchain technology. In a specific implementation, an email authorization system authorizes emails from genuine cold email senders to reach recipient email inboxes after the unknown senders validate the emails by executing blockchain transactions through the email authorization system. The email inboxes of the genuine cold email senders are monitored to detect responses to the sent emails. After a response is detected, a transaction using the first blockchain address is executed. The blockchain transactions are recorded in a blockchain ledger in a blockchain network.

45 Claims, 25 Drawing Sheets

(51) Int. Cl.
*H04L 9/06* (2006.01)
*H04L 12/58* (2006.01)
*H04L 9/30* (2006.01)

(56) References Cited

U.S. PATENT DOCUMENTS

| | | | |
|---|---|---|---|
| 10,305,833 B1 | 5/2019 | Dennis | |
| 2003/0204569 A1* | 10/2003 | Andrews | H04L 51/12 709/206 |
| 2018/0053160 A1 | 2/2018 | Schwartz | |
| 2018/0053161 A1 | 2/2018 | Bordash | |
| 2018/0137507 A1* | 5/2018 | Jayachandran | G06Q 20/401 |
| 2018/0287893 A1* | 10/2018 | O'Brien | H04M 15/66 |
| 2018/0374094 A1 | 12/2018 | Kohli | |

OTHER PUBLICATIONS

U.S. Appl. No. 15/723,467 Notice of Allowance dated Apr. 1, 2019, 14 pages.

Apeltsin, "A CryptoCubic Protocol for Hacker-Proof Off-Chain Bitcoin Transactions," Cornell University Library, arXiv:1408.2824, 16 pages, Aug. 11, 2014.

Bouguila et al., "A discrete mixture-based kernal for SVMs: Application to spam and image categorization," Information Processing & Management, vol. 45, Issue 6, Nov. 2009, pp. 631-642.

Boykin et al., "Leveraging Social Networks to Fight Spam," IEEE, Apr. 2005, 8 pages.

Crispin, M., "Internet Message Access Protocol," version 4rev1, Mar. 2003, 108 pages.

Fdez-Riverola et al., "SpamHunting: An Instance-Based Reasoning System for Spam Labelling and Filtering," Decision Support Systems v43, Issue 3, Apr. 2007, 34 pages.

Klensin, "RFC 5321—Simple Mail Transfer Protocol," Oct. 2008, 83 pages.

Laurie et al., "'Proof-of-Work' Proves Not to Work," May 3, 2004, 9 pages.

Myers et al., "RFC 1939—Post Office Protocol," May 1996, 21 pages.

Salehi et al., "Enhanced genetic algorithm for spam detection in email," 2011 IEEE 2nd Int'l Cont on Software Engineering and Service Science, Beijing, Jul. 15-17, 2011, pp. 594-597.

Salehi et al., "Hybrid simple artificial immune system (SAIS) and particle swarm optimization (PSO) for spam detection," 2011 Malaysian Conference in Software Engineering, Johor Bahru, Dec. 13-14, 2011, pp. 124-129.

* cited by examiner

USER — 602

| USER ID 702 | NAME 704 | EXPECTED TOKEN 706 | PRIVATE KEY FOR WALLET SERVICE 708 | OPTIONAL 710 |
|---|---|---|---|---|
| 1001 | John E. Murphy | 400 | [Private Key for John E. Murphy] | |
| 1002 | Fernando C. Cash | 250 | [Private Key for Fernando C. Cash] | |
| 1003 | Jonathon Smith | 10 | [Private Key for Jonathon Smith] | |
| 1004 | Kristine B. Odaniel | 100 | [Private Key for Kristine B. Odaniel] | |
| 1005 | Carl N. Brewington | 2000 | [Private Key for Carl N. Brewington] | |
| 1006 | Brandon R. Rufus | 5 | [Private Key for Brandon R. Rufus] | |

FIG. 7

REGISTERED EMAIL ACCOUNT — 604

| EMAIL ACCOUNT ID 802 | USER ID 702 | EMAIL ACCOUNT ADDRESS 804 | EMAIL ACCOUNT TYPE 806 | OPTIONAL 808 |
|---|---|---|---|---|
| 101 | 1001 | JohnEMurphy@teleworm.us | OUTLOOK | |
| 102 | 1001 | JohnEMurphy@gmail.com | GMAIL | |
| 103 | 1002 | FernandoCCash@dayrep.com | OUTLOOK | |
| 104 | 1003 | jsmith@gmail.com | GMAIL | |
| 105 | 1004 | daniel@toprecruiters.com | GMAIL | |
| 106 | 1005 | CarlNBrewington@yahoo.com | YAHOO | |
| 107 | 1006 | brandon@rufus.com | imap.rufus.com:993;smtp.rufus.com:556 | |

FIG. 8

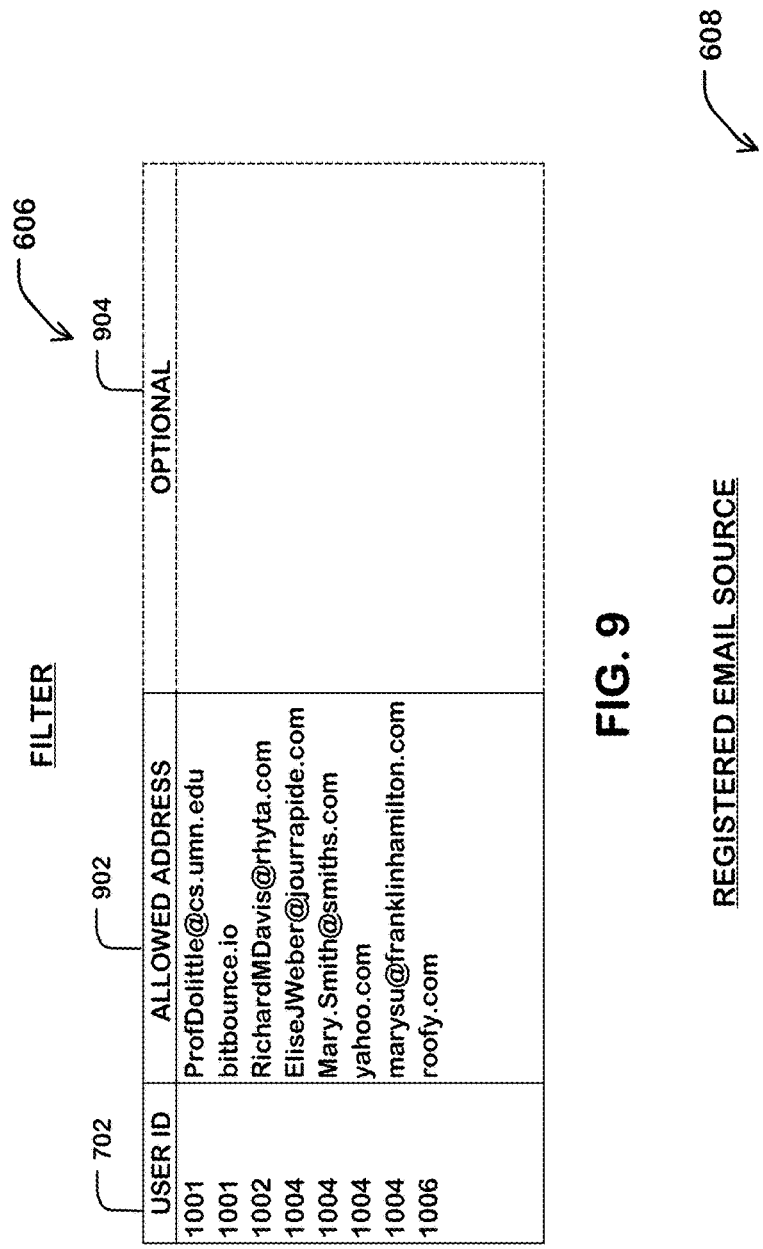

UNAUTHORIZED EMAIL 610

| EMAIL ID 1102 | SUBJECT 1104 | EMAIL ACCOUNT ID 802 | SENDER ADDRESS 1106 | CURRENT FOLDER 1108 | TOKEN RECEIVED? 1110 | OPTIONAL 1112 |
|---|---|---|---|---|---|---|
| 1 | GET PAID $500/hr | A101 | JohnKelly@yahoo.com | UNAUTHORIZED | FALSE | |
| 2 | Job recommendation | A105 | Mary.Smith@smiths.com | INBOX | TRUE | |
| 3 | *FREE VACATION* | A101 | goodlife@gmail.com | UNAUTHORIZED | FALSE | |
| 4 | Invitation to join ACM Artificial Intelligence Committee | A106 | ProfDolittle@cs.umn.edu | INBOX | TRUE | |

FIG. 11

BLOCKCHAIN ADDRESS FOR UNAUTHORIZED EMAIL 612

| EMAIL ID 1102 | EMAIL BLOCKCHAIN ADDRESS 1202 | TRANSACTION MADE? 1204 | OPTIONAL 1206 |
|---|---|---|---|
| 1 | N0zmDwVrWc | FALSE | |
| 2 | sFipgWUUYq | TRUE | |
| 3 | zxmaF18M4I | FALSE | |
| 4 | 2zblUwBTmv | TRUE | |

FIG. 12

COLD EMAIL 614

| EMAIL ID | EMAIL ACCOUNT ID | RECIPIENT ADDRESS | FIRST BLOCKCHAIN ADDRESS | INCENTIVE | INCENTIVE RECEIVED? | RESPONDED TO? | OPTIONAL |
|---|---|---|---|---|---|---|---|
| 1 | A101 | JohnKelly@yahoo.com | N0zmDwVrWc | 20 | YES | NO | |
| 2 | A105 | Mary.Smith@smiths.com | sFIpgWUUYq | 1200 | YES | NO | |
| 3 | A101 | goodlife@gmail.com | zxmaF18M4I | 400 | YES | YES | |
| 4 | A106 | ProfDolittle@cs.umn.edu | 2zbIUwBTmv | 3000 | YES | YES | |

FIG. 13

INTERNAL WALLET SERVICE 630

| USER ID | TOKEN AMOUNT | BLOCKCHAIN ADDRESS | PRIVATE KEY(S) | OPTIONAL |
|---|---|---|---|---|
| 1007 | 5000.00 | NcuCbHEf3W | [..] | |
| 1004 | 890.00 | RID5YXJZpe | [..] | |
| 1008 | 10000.00 | r6f0T9BM3w | [..] | |
| 1007 | 10.00 | LFvuSE8dAF | [..] | |
| 1004 | 50.00 | Eydkv43SB9 | [..] | |

| EMAIL BLOCKCHAIN ADDRESS | TIMESTAMP | TOKEN RECEIVED |
|---|---|---|
| 2zbIUwBTmv | 2017-09-12T22:56:33+00:00 | 2000 |

FIG. 28B

BLOCKCHAIN BASED COLD EMAIL DELIVERY

PRIORITY APPLICATION

This application claims the benefit of U.S. Provisional Patent Application No. 62/535,910, filed 23 Jul. 2017; which application is incorporated herein by reference.

RELATED APPLICATION

The following U.S. patent application is incorporated by reference herein: U.S. application Ser. No. 15/723,467, filed 3 Oct. 2017.

BACKGROUND

Field

The present invention relates to authorization of emails from unknown senders, and more particularly, to authorizing emails from unknown senders to be delivered to the recipients using blockchain technology.

Description of Related Art

Electronic mail (email) is a fast and powerful tool for information exchange between individuals and organizations. Due to the immense popularity, low cost, and fast delivery characteristics of email, the technology is prone to be misused. In the recent years, a vast majority of the email traffic could be considered spam. Spammers create and exploit free webmail accounts, and send spam emails directly to victims' mailboxes by exploiting the computational power and network bandwidth of their hosts. Spam emails are also used to spread threats, including malicious software (e.g., internet worms, Trojan horses, computer viruses and spyware) and phishing (i.e., attacks that seek to acquire sensitive information from spam email recipients). Spam emails are not only a nuisance for the email users but, additionally, cost billions of dollars in productivity losses.

Many spam filtering methods are used by email service providers and organizations. There are three main approaches for spam filtering: content-based filtering, real-time blacklisting, and sender reputation mechanisms. Content-based filtering refers to techniques in which the body of the email, attached executables, pictures or other files are analyzed and processed to determine whether the email can be classified as spam. Significant computational resources are wasted on the filtering process, thus making it fairly costly. Real-time blacklisting is another technique for mitigating spam by maintaining a "blacklist" of locations, or Internet Protocol (IP) addresses on the Internet reputed to send spam emails. Internet Service Providers (ISP) and email server software can be configured to reject or flag messages which have been sent from a site listed on one or more such blacklists. Although real-time blacklisting is a fast filtering process, it is not very effective as spammers can bypass the blacklists by repeatedly changing their IP addresses. Another shortcoming of real-time blacklisting is that whenever an IP prefix is blacklisted, both spammers and benign senders who share the same prefix might be rejected. Sender reputation mechanisms for spam email mitigation are a collection of methods for computing the reputation of email senders. The computation is usually based on information extracted from the network, the transport level, social network information or other useful identifiers. When a sending pattern of a sender reflects that of a spammer, his reputation typically decreases. If the reputation of a sender goes below a predefined threshold, the system typically rejects the sender's emails, at least until he gains up some reputation, by changing his sending properties. Various Machine learning algorithms for computing sender reputation from data sets include Bayesian classifier (P. Boykin et al., Leveraging Social Networks to fight Spam, IEEE Computer, 38(4), pp. 61-68, 2005), support vector machine-based classifier (N. Bouguila et al., A discrete mixture-based kernel for SVMs: application to spam and image categorization, Information Processing & Management, 45, pp. 631-642, 2009), genetic algorithm (S. Salehi et al., Enhanced genetic algorithm for spam detection in email, 2nd IEEE International Conference on Software Engineering and Service Science, pp. 594-597, 2011), artificial immune system (S. Salehi and A. Selamat, Hybrid simple artificial immune system (SAIS) and particle swarm optimization (PSO) for spam detection, 5th IEEE Malaysian Conference on Software Engineering (MySEC), pp. 124-129, 2011), and case-based technique (F. Fdez-Riverola et al., SpamHunting: An instance-based reasoning system for spam labeling and filtering, Decision Support Systems, 43, pp. 722-736, 2007).

Apart from spam emails, email users may also receive another form of unsolicited emails from unknown recipients known as "cold" emails. A cold email is an email that is sent to a recipient without sufficient prior contact between the sender and the recipient. Examples of cold emails include emails from job seekers to potential employers, from entrepreneurs to investors, from salespeople to corporate executives and customers for potential business opportunities, from recruiters to potential job candidates, and so on. While cold emails can be sent with good intentions from genuine senders (e.g., a job seeker sending a well-written email to one potential employer), in some instances the sender can be considered a borderline spammer (e.g., a fresh college graduate sending a generic email inquiring about available positions to twenty potential employers). Communicating with target recipients via cold emails is somewhat risky for cold email senders as there is no guarantee that the target recipient will respond to the email reliably. The target recipients of cold emails may feel that responding to some or all cold emails received may not be the best usage of their valuable time.

It is desirable to provide an email exchange solution that can more effectively filter out both spam emails and non-genuine cold emails.

SUMMARY

A system and a method are provided that can be used for filtering out spam and non-genuine cold emails, while presenting a technological approach to bypass spam filtering based on authorization protocols for the delivery of email from cold email sources.

In one embodiment, emails in a recipient email channel are selected using filters, for example, where the filters may apply algorithms to select emails to tag as unauthorized that are not part of an established list (white list) associated with the recipient or other processes that can classify incoming emails. The selected emails are tagged as not authorized, and can in some cases be blocked from delivery to the recipient's email inbox, or removed from the recipient's email inbox. Procedures are described by which an email can be authorized by execution of an authorization procedure.

In one example, the authorization procedure for a particular selected email includes creating an individual blockchain address, and sending a message to the sender of the particular selected email, prompting execution of a blockchain transaction associated with the individual blockchain address of the particular filtered email. A sender of a genuine cold email may validate the particular selected email by executing the blockchain transaction associated with the individual blockchain address of the particular filtered email. The blockchain transaction will be recorded in a blockchain ledger maintained by a blockchain network. The blockchain ledgers in the blockchain network are monitored to detect the completion of the prompted blockchain transaction. After the system detects and verifies a record for the prompted blockchain transaction in the blockchain network, the particular selected email from the sender can be classified as authorized, and in some cases can be moved out of a message folder holding unauthorized emails to the recipient's email inbox.

In another embodiment, emails in a recipient email channel which may otherwise be blocked by a whitelist filter, are selected using filters, for example, where the filters may apply algorithms to select emails that are from registered senders of genuine cold emails. The selected emails are tagged as not authorized, and can in some cases be blocked from delivery to the recipient's email inbox, or removed from the recipient's email inbox. A particular selected email is validated by executing transactions associated with particular selected emails and with the blockchain addresses associated with email addresses of registered senders of genuine cold emails. In one embodiment, executing a transaction includes creating an individual blockchain address, and validating the selected email by executing a blockchain transaction associated with the individual blockchain address of the particular filtered email. In another embodiment, executing a transaction includes maintaining records of account associated with recipient email addresses, and linking the blockchain addresses and encryption keys for the first-mentioned blockchain addresses in the record of account of the particular email recipients. After the system executes the transaction, the particular selected email from the genuine cold email sender can be classified as authorized, and in some cases can be moved from a message folder holding unauthorized emails to the recipient's email inbox.

In one embodiment, a validation process of a particular cold email, that may be otherwise blocked by a whitelist filter, for example, is initiated by executing a first blockchain transaction associated with an individual first blockchain address of the particular cold email. The particular cold email is authorized to be delivered to an email inbox folder for the recipient email address. The email inbox of the sender of the genuine cold email is monitored to detect a response to the sent particular email. After a response is detected, a transaction using the first blockchain address is executed. In one embodiment, the transaction includes creating a second blockchain address associated with the recipient email address and executing a second blockchain transaction using the second blockchain address and the first blockchain address. In another embodiment, the transaction includes maintaining a record of account associated with the recipient email addresses, and wherein executing a transaction includes linking the first blockchain address and an encryption key for the first blockchain transaction in the record of account.

In one embodiment, the blockchain transactions have specified characteristics, such as involving a transfer of a predetermined amount of cryptocurrency to the individual blockchain address associated with the email. Other types of blockchain transactions can be used as well, such as transfer of a specified cryptographic token, or proof of performance of an obligation set in a blockchain contract.

Embodiments of the technology described herein, or elements thereof, can be implemented in the form of a computer product including a non-transitory computer-readable storage medium with the computer usable program code for performing the method steps indicated. Furthermore, embodiments of the invention or elements thereof can be implemented in the form of an apparatus including a memory and at least one processor that is coupled to the memory and operative to perform exemplary method steps. Yet further, in another aspect, embodiments of the invention or elements thereof can be implemented in the form of means for carrying out one or more of the method steps described herein; the means can include (i) hardware module (s), (ii) software module(s) executing on one or more hardware processors, or (iii) a combination of hardware and software modules; any of (i)-(iii) implement the specific techniques set forth herein, and the software modules are stored in a computer-readable storage medium (or multiple such media).

Target recipients will benefit from an email handling system that identifies emails from serious and genuine cold email senders in their inboxes. Genuine senders of cold emails will benefit from some sort of confirmation that the target recipients have received their cold emails and may respond in the near future. The target recipient may be rewarded if he/she decides to respond to a cold email from a genuine sender. Associating a reward may enable the genuine senders of cold emails to have a better chance of receiving responses to their sent cold emails.

These and other features, aspects, and advantages of the invention will become apparent from the following detailed description of illustrative embodiments thereof, which is to be read in connection with the accompanying drawings.

BRIEF DESCRIPTION OF THE DRAWINGS

FIG. 7 is a symbolic drawing indicating how the user database in FIG. 6 is organized, according to an embodiment of the invention.

FIG. 8 is a symbolic drawing indicating how the registered email account database in FIG. 6 is organized, according to an embodiment of the invention.

FIG. 9 is a symbolic drawing indicating how the filter database in FIG. 6 is organized, according to an embodiment of the invention FIG. 10 is a symbolic drawing indicating how the registered email source database in FIG. 6 is organized, according to an embodiment of the invention FIG. 11 is a symbolic drawing indicating how the unauthorized email database in FIG. 6 is organized, according to an embodiment of the invention.

FIG. 12 is a symbolic drawing indicating how the blockchain addresses for the unauthorized database in FIG. 6 is organized, according to an embodiment of the invention.

FIG. 13 is a symbolic drawing indicating how the cold email database in FIG. 6 is organized, according to an embodiment of the invention.

FIG. 14 is a symbolic drawing indicating how the internal wallet in FIG. 6 is organized, according to an embodiment of the invention.

FIGS. 28A and 28B (hereafter FIG. 28) illustrate an example blockchain ledger data structure in a blockchain network that implements the technology disclosed.

DETAILED DESCRIPTION

Figure 1:
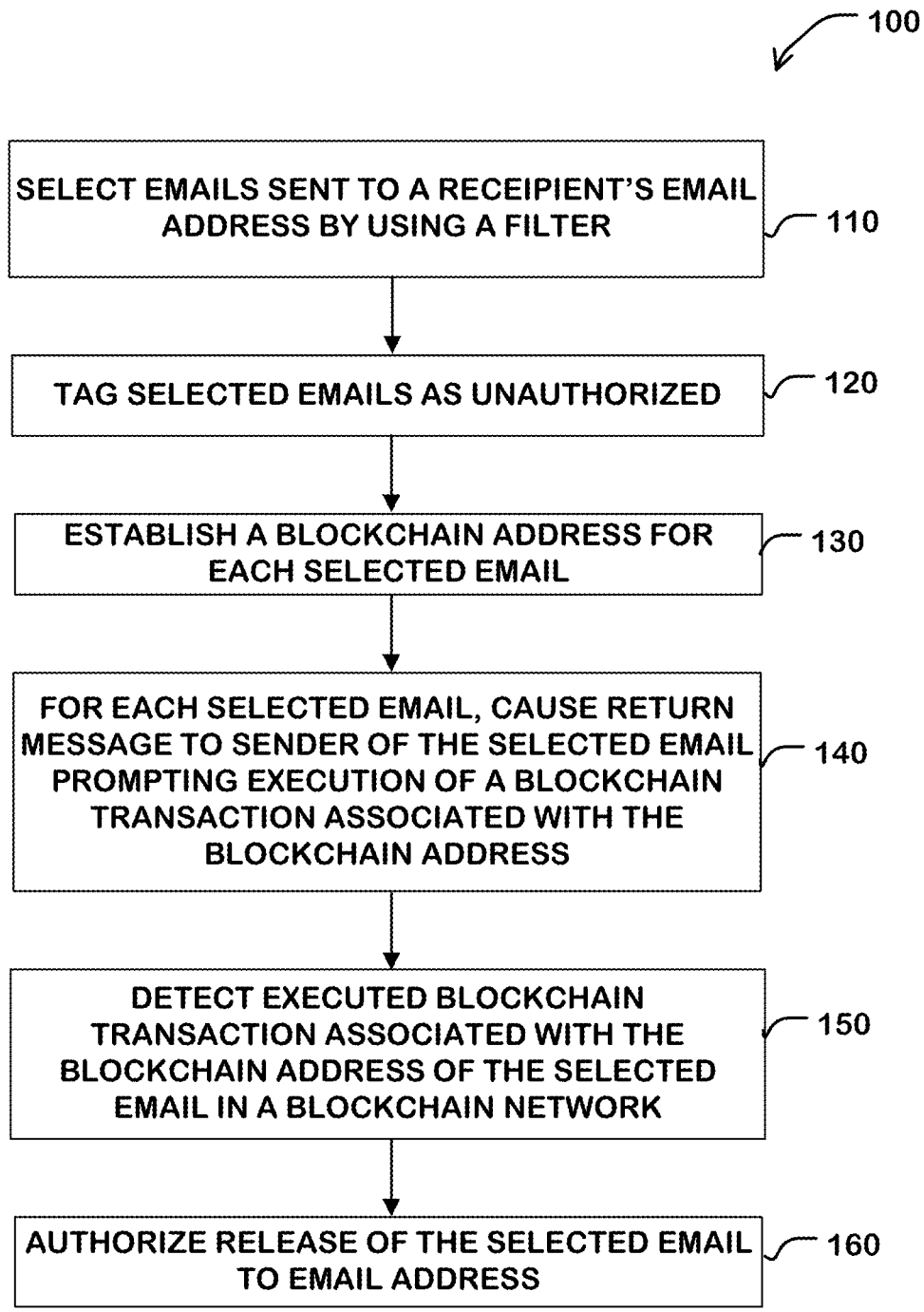
FIG. 1 illustrates a first example process flow of an email authorization system.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

Email, short for Electronic Mail, is a method of exchanging messages between people using electronics. Email operates across computer networks, which today is primarily the Internet. Email messages consist of two major sections, the message header, and the message body, collectively known as content. The header is structured into fields such as From (specifying the sender), To (specifying one or more recipients), Subject, Date, and other information about the email. The body contains the message in HTML format and/or as unstructured text. In addition to the message body, images, multimedia or documents can also be attached to emails.

An email server is a computer processor that serves as an electronic post office for emails. Emails exchanged across networks are passed between email servers. Email servers can run an email server software which is built around agreed-upon, standardized protocols for handling emails. An example of such a protocol is Simple Mail Transfer Protocol (SMTP). Various computer software that can be used to run an email server includes Novell Groupwise™, Lotus Notes™, Microsoft Exchange Servers™, Sendmail™, Postfix™, and Exim™. An email server can also run as a web-based email platform, such as Gmail™, Hotmail™, or Yahoo! Mail™. Most email server systems are based on a store-and-forward model where email servers accept, forward, deliver, and store messages for email users. Neither the users nor their email receiving devices are required to be online continuously to receive or send emails; they need to connect only briefly for as long as it takes to send or receive messages. In the process of transporting email messages between email servers, SMTP communicates delivery parameters and information using email message header fields.

In order to send or receive emails, an email user can use an email account on an email server. An email address identifies an email account to which email messages to the user are delivered. The general format of an email address is local-part@domain, and a specific example is jsmith@example.com. The part before the @ symbol (local-part) identifies the name of the email account. This is often the username of the recipient, e.g., j smith. The part after the @ symbol (domain) is a domain name that represents the administrative realm for the email account, e.g., an email server's domain name, example.com. A single email account may receive emails from multiple email addresses. Email channels are, for the purposes of this disclosure, a communication link on which emails in the system of email servers are transported among email servers and email clients. A recipient email channel can include a number of nodes, including an email client associated with the recipient email address, and email servers acting as email transfer agents in the network for the recipient email address. An "inbox" is used herein to refer to a mailbox folder for the recipient email address designated to act as a delivery point for newly-delivered emails in an email channel. In a typical email client, incoming emails from the email channel or channels serving the email client are placed in an inbox, and can be presented as inbox emails on a user interface on the platform in use by the email client. A client may have more than one message folder acting as inboxes, and sets of rules in place to direct emails to particular message folders.

Each sent email is associated with a message ID. A message ID is a unique identifier for an email. Message IDs are required to have a specific format which is a subset of an email address and to be globally unique. A common technique used by many email servers is to use a time and date stamp along with the email server's domain name, e.g., Message-ID: <950124.162336@example.com>. A response to the sent email will contain the Message-ID header of the original sent email, e.g., In-Reply-To: <950124.162336@example.com>.

In addition to sending and receiving emails, an email user can also maintain a "contact list" to store email addresses and other contact information of known contacts. In some embodiments, email domains and Internet Protocol (IP) addresses can also be stored in an email user's contact list. Such contact lists are typically deployed to assist composition of emails to be sent, and to provide information associated with the senders of emails that have been delivered to the email client.

In some embodiments, the email authorization system can be used in conjunction with one or more spam filtering methods.

FIG. 1 illustrates a first example process flow 100 of an email authorization system that processes emails in an email channel to a recipient email. In some embodiments, the actions in the process flow may be performed in different orders and/or with different, fewer or additional actions than those illustrated in FIG. 1. Multiple actions can be combined in some implementations.

The email authorization system begins at step 110 by selecting emails from an email channel to a recipient's email address using a classification procedure, such as a filter. The email channel may be monitored for new emails, such as by periodically polling a message folder in the email channel at an email client, or by configuring the email channel to forward new emails to a designated message folder used by the classification procedure. In some embodiments, the monitoring of the email channel includes periodically accessing the email recipient's primary inbox to identify new emails. In other embodiments, the monitoring of the email channel can include accessing a message folder other than the primary inbox, through which incoming emails may be buffered in the email channel before delivery to the primary inbox. The email authorization system includes a procedure that traverses email inbox folders, or other points in an email channel, of registered email addresses in some embodiments, removing particular selected emails from the email inbox folders (or another point), and saving the particular selected emails in a folder or folders for unauthorized emails for the registered email accounts. The email authorization system selects emails for processing by applying the classification procedure to emails in email channels of registered email accounts A filter to be used for classification of incoming emails can be composed using identifying parameters associated with emails. Emails classified, using the filter or other procedure, as unauthorized can be tagged so that the email client is notified of the unauthorized status, or so that the unauthorized email can be moved into a message folder designated for unauthorized emails, and out of the inbox.

The identifying parameters used in a filter can include for example components in an email message header, e.g., sender email address, email address domain, IP address from which the email originated, etc. In some embodiments, the recipient's contact list can be used to populate the filter applied for email to that recipient. A filter based on known contacts can be referred to as a "whitelist" filter, as opposed to a "blacklist" filter in which the filter is based on known or suspected spam emails. For an example of a whitelist, if an email address of the sender, domain of the email address, or IP address from which the email originated, includes an identifying parameter set in the filter based on a contact list, the email is not selected. If the email does not include an identifying parameter set in the filter based on the known contact list, such as one of the addresses of the sender, the domain of the email address, or IP address from which the email originated, the email is selected by the email authorization system as an unauthorized email. Any email not selected by the email authorization system may be classified as authorized, and moved into, or left in, the recipient's inbox, or otherwise identified as an authorized email.

Process flow 100 continues at step 120 where the email authorization system tags the selected emails as being unauthorized. As described herein, "tagging" an email indicates the email authorization system classified the email as unauthorized, and can comprise setting a parameter associated with the selected email enabling it to be marked in a user interface as unauthorized. Also, tagging the emails can include causing it to be removed from the inbox or other message folder at the recipient client, and causing it to be stored in a message folder designated for unauthorized emails and other actions related to storage of the email. In some embodiments, a tagged email is moved to a secondary folder in the recipient's email account, such as an "unauthorized" folder. As described herein, an "unauthorized" folder is a folder in the email account that stores tagged emails that have not been authorized by the email authorization system to be included in the recipient's email inbox. In some embodiments, the selected email may initially be placed in the inbox folder and then removed from the recipient's inbox after being tagged by the email authorization system. In some embodiments, the email authorization system may apply the filter to, and tag, an email in the email channel before the email reaches the recipient's inbox and redirect the tagged email to a location other than the recipient's inbox.

Referring to FIG. 1, at step 130, the email authorization system establishes a blockchain address for the selected emails. In some embodiments, the blockchain address is randomly generated using a public key associated with a private key that is used to encrypt transactions associated with the address. The public key/private key pair can be produced using public key cryptography. Public key cryptography uses pairs of keys: (i) public keys which may be disseminated widely, and (ii) private keys which are known only to the owner of the key. Public key cryptography accomplishes two functions: authentication, which is when the public key can be used to verify that a holder of the paired private key sent the message, and encryption, whereby only the holder of the paired private key can decrypt the message encrypted with the public key. In a public key cryptography system, any person can encrypt a message using the public key of the receiver, but such a message can be decrypted only with the receiver's private key. Private keys can be stored in desktop wallets (wallet service available on that particular machine the wallet service has been installed), cloud wallets (wallet service hosted by a third party), mobile wallets (any wallet that exists on a device that will ever connect to the internet), hardware wallets (physical devices), paper wallets (printing out the private keys on a piece of paper which will then be stored in a secure place).

In one embodiment, the private key used to produce the blockchain address of particular selected emails of an email recipient is generated and stored in a digital "wallet" of the email recipient. A digital wallet is a software program that maintains blockchain addresses and private keys held by the account holders, and supports the execution of blockchain transactions by which users send or receive cryptocurrency, pay for goods or save cryptocurrency.

Cryptocurrency is a digital asset designed to work as a medium of exchange to secure transactions between two parties using cryptography. Numerous digital wallets exist today such as Coinbase™, Bread Wallet™, Mycelium™, Exodus™ Copay™, Jaxx™, Armory™, Trezor™, Ledger Nano™, Green Address™ and Blockchain.info™. In some embodiments, the email authorization system may host its own digital wallet.

Referring to FIG. 1, at step 140, the email authorization system causes a message to be composed and sent to the sender of a particular selected email, prompting the sender to validate the selected email by executing a blockchain transaction associated with the blockchain address created for the selected email. The message can include links or software to facilitate or enable the execution of a blockchain transaction having specified characteristics.

In one embodiment, the blockchain transaction involves causing the blockchain network to add a record in the blockchain ledger that includes the specified characteristics required for authorization of the selected emails, such as a transfer of a predetermined type of token from the sender of the selected email to the recipient, transfer of a specified amount of cryptocurrency, or performance of a condition or obligation of a blockchain contract. On completion of the blockchain transaction, a party monitoring the blockchain network will be able to detect the completion of the blockchain transaction. As described herein, "token" is a means to enable the authorization of an email, selected and tagged by the email authorization system, for its intended recipient's inbox. In one embodiment, cryptocurrencies can be used as a form of token. Numerous cryptocurrencies exist today such as Bitcoin™, Ethereum™, Credo™ Bitcoin Cash™, Ripple™, Litecoin™, Dash™, Peercoin™, Namecoin™, Dogecoin™ Primecoin™, and Mastercoin™. For techniques described herein, any form of cryptocurrency can be used as tokens to execute a blockchain transaction.

The sender validates the particular selected email by executing the blockchain transaction associated with the blockchain address created for the selected email, and the executed transaction is recorded in a blockchain ledger in a blockchain network. The blockchain transaction is broadcasted to a blockchain network, specifying the blockchain address and the characteristics of the transaction, such as an amount of cryptocurrency that has been transferred.

A blockchain network hosts multiple open, distributed blockchain ledgers that can record cryptocurrency transactions between two parties efficiently and in a verifiable and permanent way. The safety, integrity, and balance of all blockchain networks are ensured by a group of mutually distrustful parties, referred to by terms such as miners or stakers, who actively protect the network by maintaining a consensus algorithm. In some embodiments, the consensus algorithm may be the proof-of-stake algorithm (PoS). Other consensus algorithms that can be used for techniques described herein are the practical Byzantine fault tolerance algorithm (PBFT), the proof-of-work algorithm (PoW), the delegated proof-of-stake algorithm (DPoS), the proof-of-authority algorithm (PoA) and the proof-of-importance algorithm (PoI). Each time a blockchain transaction is broadcasted on the blockchain network, a "miner" processes the blockchain transaction to ensure that all the information in the blockchain transaction is correct and then updates the blockchain network. For a blockchain transaction to be confirmed, it must be included in a "block" along with a mathematical proof performed by the miner based on the consensus algorithm employed by the blockchain network. These proofs are very difficult to generate and are designed to depend on the previous block, making it exponentially difficult to reverse previous blockchain transactions. Validation (or confirmation) of a blockchain transaction in a blockchain network may require confirmations on the blockchain network, with each successive confirmation adding greater confidence that a blockchain transaction is valid. A confirmation means that there is a consensus on the network that, for example, cryptocurrency involved in the transaction has not been sent to anyone else and is the property of the email recipient.

Referring to FIG. 1, at step 150, the email authorization system maintains a list of unauthorized emails, and with information identifying the characteristics of the blockchain transaction prompted for each in the return emails. The email authorization server detects executed blockchain transactions in the blockchain ledgers in the blockchain network associated with the blockchain addresses of emails in the list of unauthorized emails. For detected transactions, the authorization server verifies that it matches the prompted transaction for an email tagged unauthorized. In one embodiment, detection of the blockchain transactions is accomplished by notification from a digital wallet service, which may notify the email authorization system of the completed execution of the blockchain transaction. In another embodiment, the email authorization server detects blockchain transactions by polling the blockchain for new blocks containing transactions for the blockchain addresses of the unauthorized emails. At step 160, the email authorization system authorizes the selected emails if the selected emails have been validated by a prompted blockchain transaction which has been confirmed as executed. The authorization can be executed by removing the unauthorized tag, by moving the email out of the unauthorized list into the recipient's email channel or inbox, or otherwise.

Figure 2:
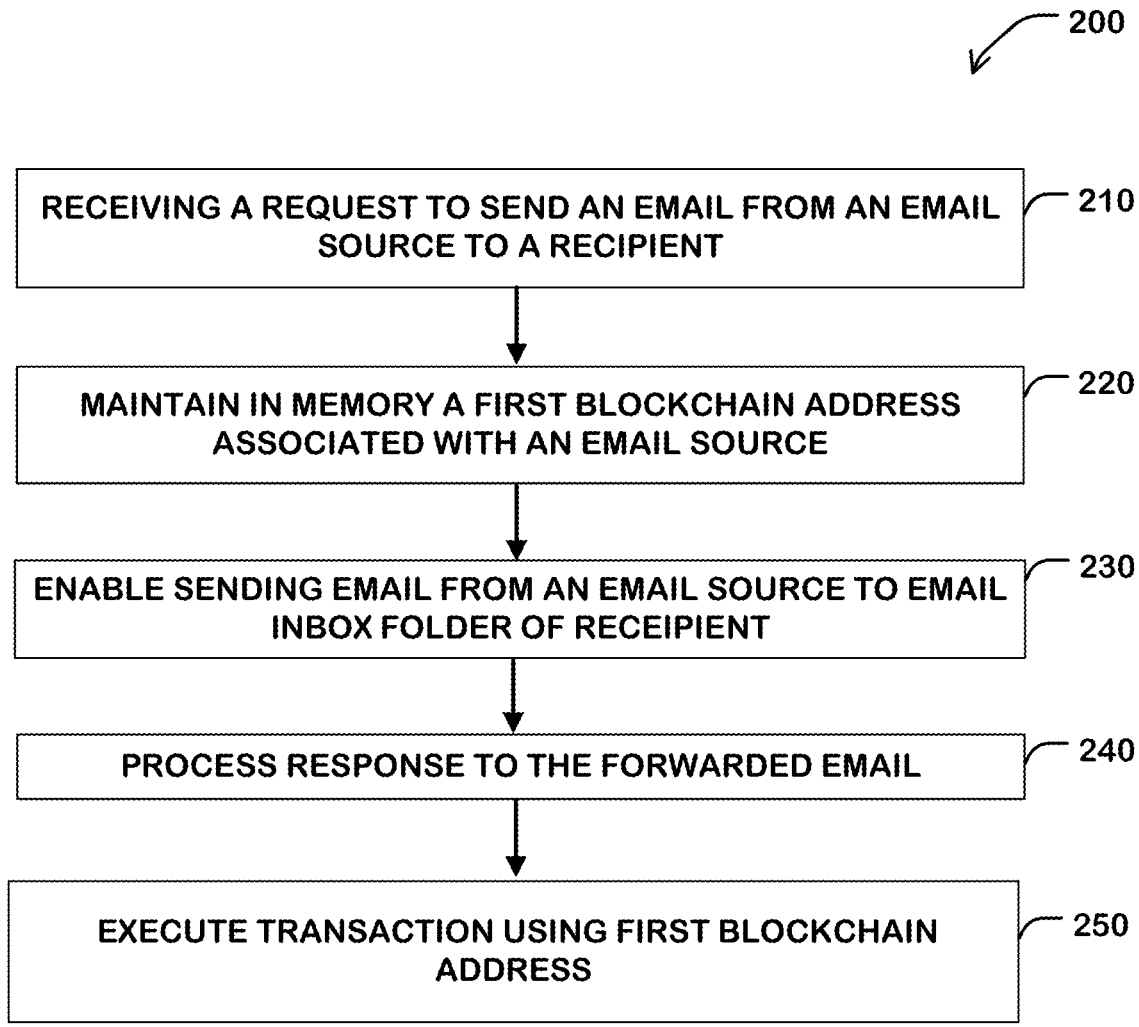
FIG. 2 illustrates a second example process flow of an email authorization system.

FIG. 2 illustrates a second example process flow 200 of an email authorization system that processes the validation of cold emails. In some embodiments, the actions in the process flow may be performed in different orders and/or with different, fewer or additional actions than those illustrated in FIG. 2. Multiple actions can be combined in some implementations.

At step 210, the email authorization system receives a request from an email source to send a cold email to a recipient. In one embodiment, the request comprises an email to be forwarded as a cold email to a specified recipient. The email authorization system can detect the source of the email, and respond to the email as the request. In another embodiment, the email authorization system hosts an interface configured to enable registered email sources to compose a cold email, and input a request for the composed email to be delivered to one or more recipients. An email source can be identified in an email by parameters associated with emails. The identifying parameters used in a filter can include for example components in an email message header, e.g., sender email address, email address domain, IP address from which the email originated, etc. In another embodiment, the email authorization system may monitor the email channels, such as by configuring the email channel to forward sent emails to the email authorization system.

The received email may be associated with a first blockchain transaction, associated with a first blockchain address. In one embodiment, the first blockchain address is created by the email authorization system. In another embodiment, the sender's digital wallet may create the first blockchain address. In one embodiment, the first blockchain transaction involves causing the blockchain network to add a record in the blockchain ledger that includes the specified characteristics required for validation of the sent emails, such as a transfer of a predetermined type of token from the sender of the email to the email authorization system, transfer of a specified amount of cryptocurrency, or performance of a condition or obligation of a blockchain contract. On completion of the blockchain transaction, a party monitoring the blockchain network will be able to detect the completion of the blockchain transaction.

Referring to FIG. 2, at step 220, the email authorization system maintains a list of cold emails and a list of first blockchain addresses associated with the emails, and with information identifying the characteristics of the first blockchain transaction executed for each of the emails. The email authorization system may detect the executed first blockchain transactions in the blockchain ledgers in the blockchain network associated with the first blockchain addresses of emails. In one embodiment, detection of the executed first blockchain transactions is accomplished by notification from a digital wallet service, which may notify the email authorization system of the completed execution of the blockchain transaction. In another embodiment, the email authorization system detects the first blockchain transactions by polling the blockchain network for new blocks containing transactions for the first blockchain addresses of the sent emails.

At step 230, the email authorization system enables the delivery of the received cold email to the email inbox folder of the recipient. In one embodiment, the email authorization system may deliver the cold email to the email inbox folder of the recipient. In another embodiment, the email authorization system may authorize the email server associated with the email source to forward the email to the email inbox folder of the recipient. In some embodiments, the email authorization system may execute the procedure described with reference to FIG. 1, in which case the cold email may be marked as unauthorized. The email authorization system can detect in this case whether the unauthorized email is a member of a list of cold emails, and if so then perform the process described here. If the unauthorized email is not a member of a list of cold emails, then the email authorization system can execute a procedure like that of FIG. 1.

At step 240, responses to the sent cold email are detected in the email inbox folders associated with the email source is this example. Other embodiments may detect responses using other techniques, such as receiving notifications from the respondent (recipient of the cold email) in other channels. The email channel associated with the email source may be monitored for responses, such as by periodically polling a message folder in the email channel at an email server, or by configuring the email channel to forward new emails to a designated message folder used by the classification procedure. In some embodiments, the monitoring of the email channel includes periodically accessing the primary inbox to identify responses. In other embodiments, the monitoring of the email channel can include accessing a message folder other than the primary inbox, through which incoming emails may be buffered in the email channel before delivery to the primary inbox. The email authorization system includes a procedure that traverses email inbox folders, or other points in an email channel, detecting a response to the sent email by one or more identifying parameters associated with the emails. The identifying parameters can include for example components in an email message header, e.g., sender email address, email address domain, IP address from which the email originated, message ID, etc.

At step 250, the email authorization system executes a transaction using the first blockchain address. In one embodiment, a second blockchain address is created and a second blockchain transaction is executed using the first blockchain address and the second blockchain address. The email authorization system may determine a second blockchain address associated with the recipient's email address. The second blockchain transaction involves causing the blockchain network to add a record in the blockchain ledger that includes the specified characteristics such as rewarding the recipient for responding to the sent cold email by transferring the predetermined type of token from the first blockchain transaction to the recipient. The second blockchain transaction is broadcasted to a blockchain network, specifying the second blockchain address and the characteristics of the transaction, such as an amount of cryptocurrency that has been transferred. On completion of the blockchain transaction, a party monitoring the blockchain network will be able to detect the completion of the blockchain transaction. In another embodiment, records of accounts associated with the recipients' email addresses may be maintained, and an off-chain transaction may be executed. The off-chain transaction includes linking the first blockchain address and an encryption key for the first blockchain transaction in the record of account to the recipient.

An off-chain transaction is a transaction that is locally processed by a wallet service and not recorded on a blockchain network. The sender and receiver use the wallet service as a trusted third party to record and guarantee the transaction. While a blockchain transaction depends on the blockchain network to determine its validity, an off-chain transaction relies on other methods to record and validate the transaction, such as a payment channel implementing Hashed Timelock Contracts, Sidechains, etc. Senders and receivers in an off-chain transaction must agree to accept the particular method by which the transaction occurs. Off-chain transactions allow for the immediate transfer of tokens between two parties, without delays or unavoidable transaction fees of validating transactions by the blockchain network. During an off-chain transaction, blockchain addresses and private/public keys associated with the transaction are linked to the receiver. In one embodiment, "linking" blockchain addresses and keys includes assigning the blockchain addresses and encryption keys to the receiver. In one embodiment, "linking" blockchain addresses and keys includes giving the receiver effective access to the blockchain addresses and encryption keys. In another embodiment, "linking" blockchain addresses and keys includes notifying the trusted third part of the reassignment of the blockchain addresses and keys to the receiver. Digital wallets such as Coinbase™ allow off-chain transactions between various users within its system. Off-chain channels, such as Lightning Network™ and Raiden Network™, also allow off-chain transactions between various users by creating a relationship between the users, and updating token balances after transactions without broadcasting to the blockchain network.

Figure 3:
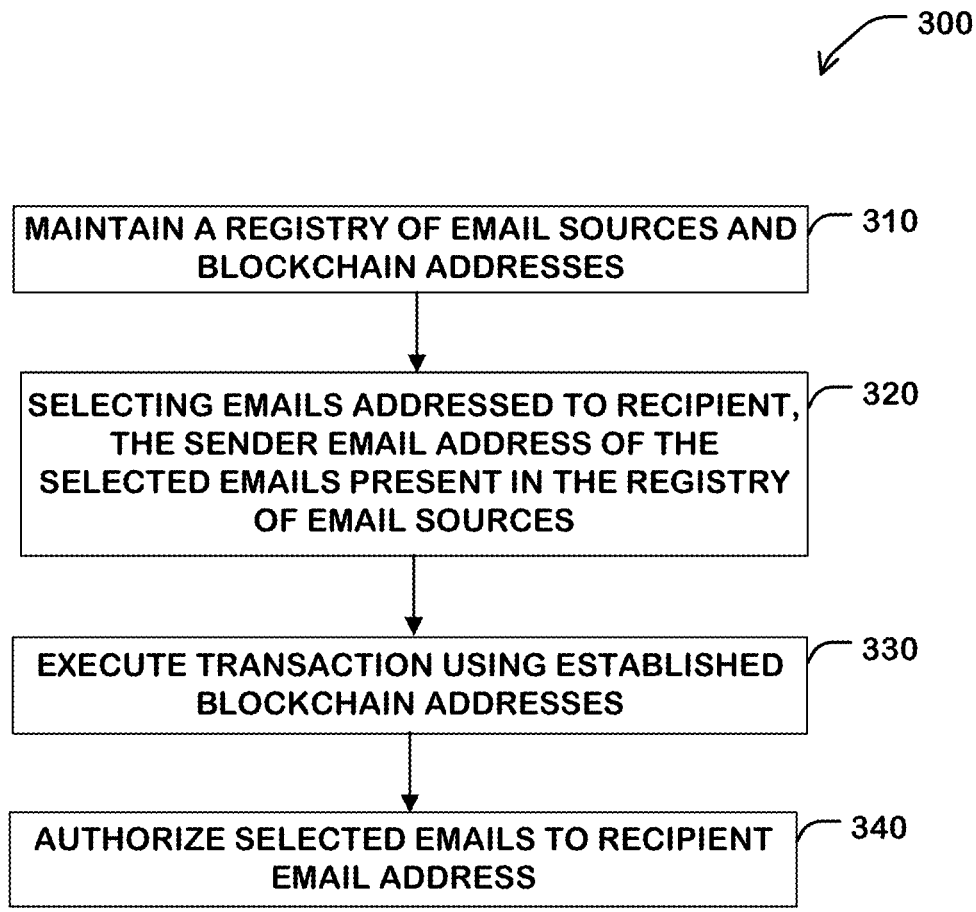
FIG. 3 illustrates a third example process flow of an email authorization system.

FIG. 3 illustrates a third example process flow 300 of an email authorization system that detects cold emails in recipient's email channels and validates the detected emails. In some embodiments, the actions in the process flow may be performed in different orders and/or with different, fewer or additional actions than those illustrated in FIG. 3. Multiple actions can be combined in some implementations.

The process flow 300 begins at step 310 where the email authorization system maintains a list of email sources associated with registered cold email senders. The identifying parameters for the email sources can include for example components in an email message header, e.g., sender email address, email address domain, IP address from which the email originated, etc. The email authorization system also maintains a list of blockchain addresses associated with the email sources.

Process flow 300 continues at step 320 where the email authorization system selects emails from an email channel to a recipient's email address using a classification procedure, such as the maintained list of email sources for genuine cold email senders. The recipients' email channels may be monitored for new emails, such as by periodically polling a message folder in the email channel at an email client, or by configuring the email channel to forward new emails to a designated message folder used by the classification procedure. In some embodiments, the monitoring of the email channel includes periodically accessing the email recipient's primary inbox to identify new emails. In other embodiments, the monitoring of the email channel can include accessing a message folder other than the primary inbox, through which incoming emails may be buffered in the email channel before delivery to the primary inbox. The email authorization system includes a procedure that traverses email inbox folders, or other points in an email channel, of registered email addresses in some embodiments, removing particular selected emails from the email inbox folders (or other point), and saving the particular selected emails in a folder or folders for unauthorized emails for the registered email accounts.

The email authorization system may tag the selected emails as being unauthorized. As described herein, "tagging" an email indicates the email authorization system classifies the email as unauthorized, and can comprise setting a parameter associated with the selected email enabling it to be marked in a user interface as unauthorized. Also, tagging the emails can include causing it to be removed from the inbox or other message folder at the recipient client, and causing it to be stored in a message folder designated for unauthorized emails and other actions related to storage of the email. In some embodiments, a tagged email is moved to a secondary folder in the recipient's email account, such as an "unauthorized" folder. As described herein, an "unauthorized" folder is a folder in the email account that stores tagged emails that have not been authorized by the email authorization system to be included in the recipient's email inbox. In some embodiments, the selected email may initially be placed in the inbox folder and then removed from the recipient's inbox after being tagged by the email authorization system. In some embodiments, the email authorization system may tag an email in the email channel before the email reaches the recipient's inbox and redirect the tagged email to a location other than the recipient's inbox.

At step 330, the email authorization system executes a transaction for the selected email. In one embodiment, a blockchain address is created and a blockchain transaction is executed using the blockchain address. The email authorization system may determine a blockchain address associated with the recipient's email address. The blockchain transaction involves causing the blockchain network to add a record in the blockchain ledger that includes the specified characteristics required for validation of the selected emails, such as a transfer of a predetermined type of token from the sender of the selected cold email to the recipient, transfer of a specified amount of cryptocurrency, or performance of a condition or obligation of a blockchain contract. On completion of the blockchain transaction, a party monitoring the blockchain network will be able to detect the completion of the blockchain transaction. The email authorization system validates the particular selected email by executing the blockchain transaction associated with the blockchain address created for the selected email, and the executed transaction is recorded in a blockchain ledger in a blockchain network. The blockchain transaction is broadcasted to a blockchain network, specifying the blockchain address and the characteristics of the transaction, such as an amount of cryptocurrency that has been transferred. In another embodiment, records of accounts associated with the recipients' email addresses may be maintained, and an off-chain transaction may be executed. The off-chain transaction includes linking the first blockchain address and an encryption key for the first blockchain transaction in the record of account to the recipient.

At step 340, the email authorization system authorizes the selected cold emails to be included in the recipients' email inbox folders. The authorization can be executed by removing the unauthorized tag, by moving the email out of the unauthorized list into the recipient's email channel or inbox, or otherwise. In some embodiments, the email authorization system may execute the procedure described with reference to FIG. 1, in which case the cold email may be marked as unauthorized. The email authorization system can detect in this case whether the source of the unauthorized email is a member of a list of registered cold email sources, and if so then perform the process described here. If the unauthorized email is not a member of a list of registered cold email sources, then the email authorization system can execute a procedure like that of FIG. 1.

The processes of FIG. 1, FIG. 2, and/or FIG. 3 can be implemented using a computer system storing computer software for execution which has access to the email channels of registered users. The network node can be implemented on a machine coupled to the internet including, in some embodiments, the same machine as is used by email recipients, and in other embodiments, a cloud-based server, and in other embodiments, any point of presence on a network connected to the internet.

The computer software implementing the process of FIG. 1, FIG. 2, and/or FIG. 3 can be stored in computer-readable memory, or other non-transitory data storage medium, for the purposes of distribution to machines to execute the procedures, or for access by a processor or processors executing the procedure.

System Overview

Figure 4:
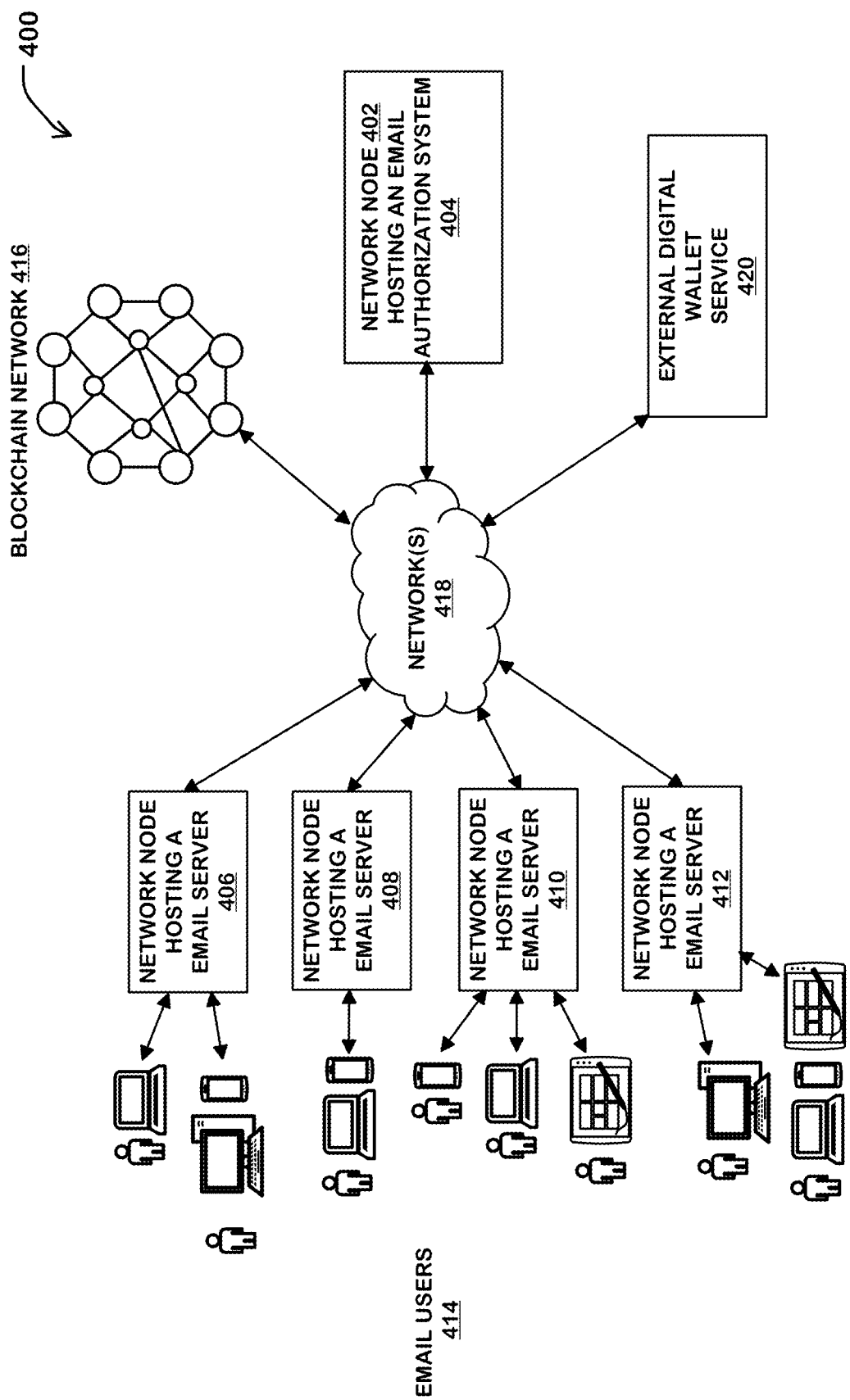
FIG. 4 illustrates an architectural level schematic of an environment that includes an email authorization system in accordance with an implementation.

FIG. 4 illustrates an architectural level schematic of an environment in which an email authorization system executing procedures like that of FIG. 1, FIG. 2 and FIG. 3 is deployed in a network node 402 on the network. Because FIG. 4 is an architectural diagram, certain details are intentionally omitted to improve the clarity of the description. The discussion of FIG. 4 will be organized as follows. First, the elements of the figure will be described, followed by their interconnections.

The system 400 includes network nodes hosting email servers 406, 408, 410 and 412, the network(s) 418, a blockchain network 416, an external wallet service 420, and a network node 402 hosting an email authorization system 404. As used herein, a network node is an active electronic device or virtual device that is attached to a network, and is capable of sending, receiving, or forwarding information over a communications channel. Examples of electronic devices which can be deployed as network nodes include all varieties of computers, workstations, laptop computers, handheld computers, and smartphones. Network nodes can be implemented in a cloud-based server system. More than one virtual device configured as a network node can be implemented using a single physical device. For the sake of clarity, only four network nodes hosting email servers and one external wallet service are shown to be connected to the network node 402 hosting an email authorization system 404 through the network(s) 418. However, any number of network nodes hosting email servers and external wallet services can be connected to the network node 402 hosting an email authorization system 404 through the network(s) 418.

The interconnection of the elements of system 400 will now be described. Network(s) 418 couples the network nodes hosting email servers 406, 408, 410 and 412, the blockchain network 416, the external wallet service 420, and the network node 402 hosting the email authorization system 404, all in communication with each other (indicated by solid double-arrowed lines). Email users 414 are connected to the network node 402 hosting the email authorization system 404 through network nodes hosting email servers 406, 408, 410 and 412. Each email user has an email account on their respective email server. In some embodiments, email users 414 may include one or more individuals who utilize the functionality of an email authorization system to identify genuine cold emails. Various computer software that can be used to run an email server includes Novell Groupwise™, Lotus Notes™, Microsoft Exchange Servers™, Sendmail™, Postfix™, and Exim™. A web-based email platform, such as Gmail™, Hotmail™, or Yahoo! Mail™ can also be used. In the technology described herein, email servers hosted in network nodes 406, 408, 410 and 412 can use any of the platforms described. Users 414 can access their emails through many devices including in some examples the following devices: a smartphone, a personal computing (PC) device such as a desktop or laptop computer, a media center device or other PC derivative, portable media consumption device (mobile terminal, personal digital assistant (PDA), gaming and/or media console, etc.), a tablet computer, other consumer electronic device, or the like.

An email channel from an email server to an email client can be executed according to an email protocol like Internet Message Access Protocol IMAP, Post Office Protocol—Version 3 POP3 (other versions) and HTTP for web-based email interfaces. See, Crispin, "Internet Message Access Protocol—Version 4rev1", RFC 3501, March 2003; Myers, "Post Office Protocol—Version 3," RFC 1939, May 1996. An email channel between email servers acting as message transfer agents can be executed according to a protocol such as Simple Mail Transfer Protocol (SMTP). See, Klensin, J., "Simple Mail Transfer Protocol," RFC 5321, DOI 10.17487/RFC5321, October 2008, <http://www.rfc-editor.org/info/rfc5321>, which is incorporated herein by reference. Alternatives, such as proprietary email servers, can execute different protocols to carry emails on an email channel to an email recipient. In addition to protocols, email clients can access email servers via application programming interfaces (APIs).

The actual communication path through the internet can be point-to-point over public and/or private networks. The communications can occur over a variety of networks 418, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The blockchain network 416 is a distributed and public ledger which maintains records of all the blockchain transactions on the blockchain. In some embodiments, the blockchain network is a peer-to-peer network and does not require a central authority or trusted intermediaries to authenticate or to settle the transactions or control the underlying infrastructure. Examples of popular blockchain platforms include Ethereum™, Eris™, Multichain™, Bitcoin™, Hyperledger Fabric™, and Hyperledger Corda™.

Users 414 can maintain a cryptocurrency balance and send or receive cryptocurrency through the external wallet service 420. Examples of popular wallets include Coinbase™, Bread Wallet™, Mycelium™, Exodus™, Copay™, Jaxx™ Armory™, Trezor™, Ledger Nano™, Green Address™, and Blockchain.info™.

Figure 5:
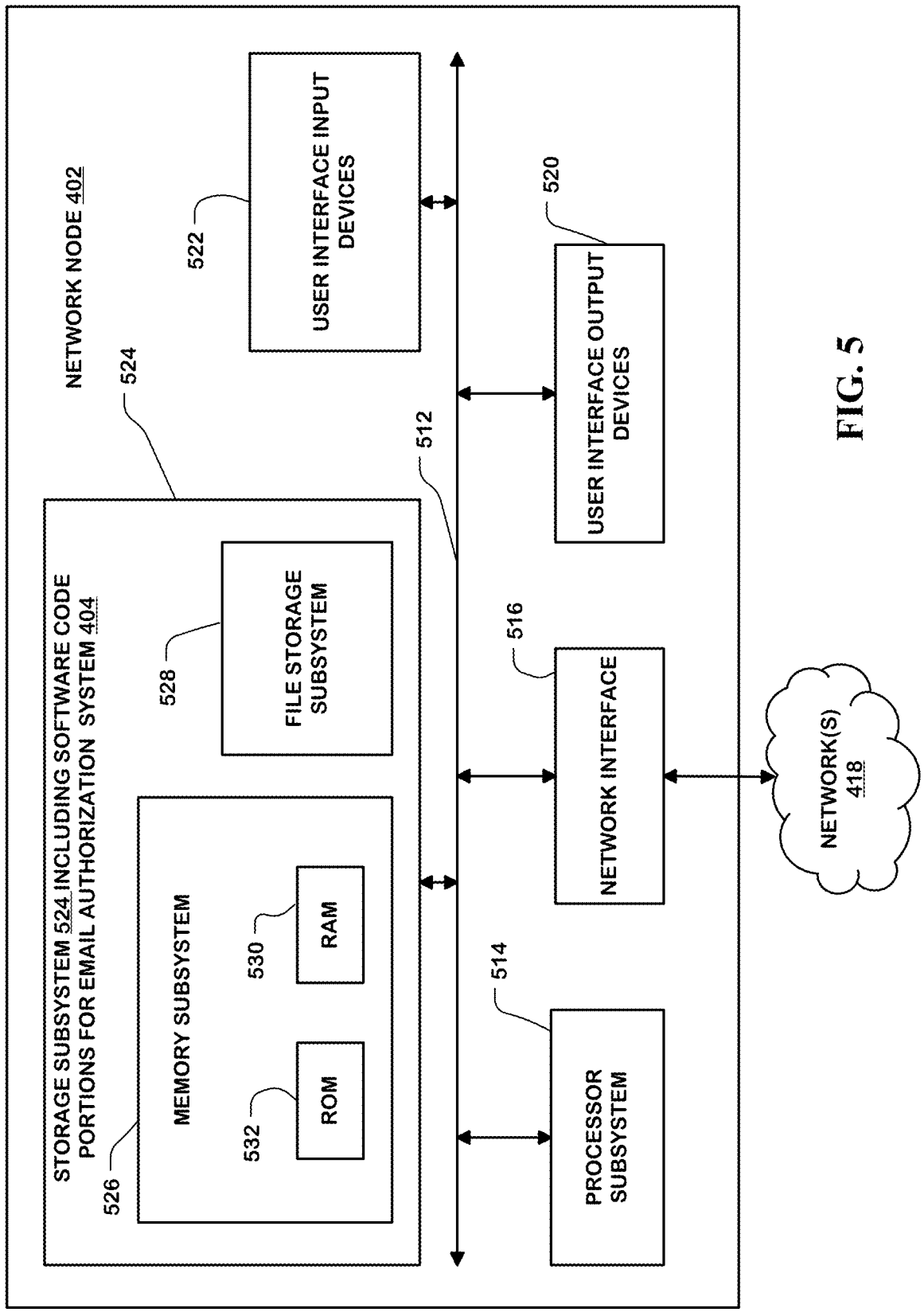
FIG. 5 is a simplified block diagram of a network node hosting an email authorization system.

The network node 402 hosts an email authorization system 404. FIG. 5 is a simplified block diagram of a network node that can be used to implement email authorization system 404. Network node 402 typically includes an operating system executed by a processor subsystem 514 which communicates with a number of peripheral devices via bus subsystem 512. These peripheral devices may include a storage subsystem 524, comprising a memory subsystem 526 and a file storage subsystem 528, user interface input devices 522, user interface output devices 520, and a network interface subsystem 516. The input and output devices allow user interaction with network node 402. Network interface subsystem 516 provides an interface to outside network 418 and is coupled via network 418 to other elements in system 400. The physical hardware components of network interfaces are sometimes referred to as network interface cards (NICs), although they need not be in the form of cards; for instance they could be in the form of integrated circuits (ICs) and connectors fitted directly onto a motherboard, or in the form of macrocells fabricated on a single integrated circuit chip with other components of the computer system.

User interface input devices 522 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into network node 402 or onto network 418.

User interface output devices 520 may include a display subsystem, a printer, a fax machine, or nonvisual displays such as audio output devices. The display subsystem may include a cathode ray tube (CRT), a flat-panel device such as a liquid crystal display (LCD), a projection device, or some other mechanism for creating a visible image. The display subsystem may also provide a nonvisual display such as via audio output devices. In general, use of the term "output device" is intended to include all possible types of devices and ways to output information from network node 402 to the user or to another machine or network node. In particular, an output device of the network node 402 on which email authorization system 404 is implemented, may include a visual output informing a user of action recommendations made by the system, or may include a communication device for communicating action signals.

Storage subsystem 524 stores the basic programming and data constructs that provide the functionality of certain embodiments of the present invention. For example, the various modules implementing the functionality of certain embodiments of the invention may be stored in storage subsystem 524. These software modules are generally executed by processor subsystem 514.

Memory subsystem 526 typically includes a number of memories including a main random access memory (RAM) 530 for storage of instructions and data during program execution and a read-only memory (ROM) 532 in which fixed instructions are stored. File storage subsystem 528 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer-readable medium such as one or more CD-ROMs, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed. The databases and modules implementing the functionality of certain embodiments of the invention may also be stored by file storage subsystem 528. The host memory subsystem 526 contains, among other things, computer instructions which, when executed by the processor subsystem 514, cause the computer system to operate or perform functions as described herein. As used herein, processes and software that are said to run in or on "the host", "the computer" or "the network", execute on the processor subsystem 514 in response to computer instructions and data in the host memory subsystem 526 including any other local or remote storage for such instructions and data.

Bus subsystem 512 provides a mechanism for letting the various components and subsystems of network node 402 communicate with each other as intended. Although bus subsystem 512 is shown schematically as a single bus, alternative embodiments of the bus subsystem may use multiple busses.

Network node 402 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of network node 402 depicted in FIG. 5 is intended only as a specific example for purposes of illustrating the preferred embodiments of the present invention. Many other configurations of network node 402 are possible having more or less components than the system depicted in FIG. 5.

In some embodiments, the email authorization system 404 can be implemented in the network node 402 as a Software-as-a-Service (SaaS) application, a web-architected application or a cloud-delivered service. Examples of common SaaS applications today include Salesforce.com™, Box™, Dropbox™, Google Apps™ Amazon Web Services AWS™, Microsoft Office 365™, Workday™, Oracle on Demand™, Taleo™, Yammer™, and Concur™. SaaS applications provide functionalities to users that are implemented in the cloud, and that are the target of policies, e.g., logging in, editing user information, updating whitelists, deleting contacts from the contact list, in contrast to the offerings of simple websites and e-commerce sites. Note that a SaaS application can be supported by both web browser clients and application clients that use URL-based APIs (application programming interfaces).

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and Yahoo! S4™.

Email Authorization System

Figure 6:
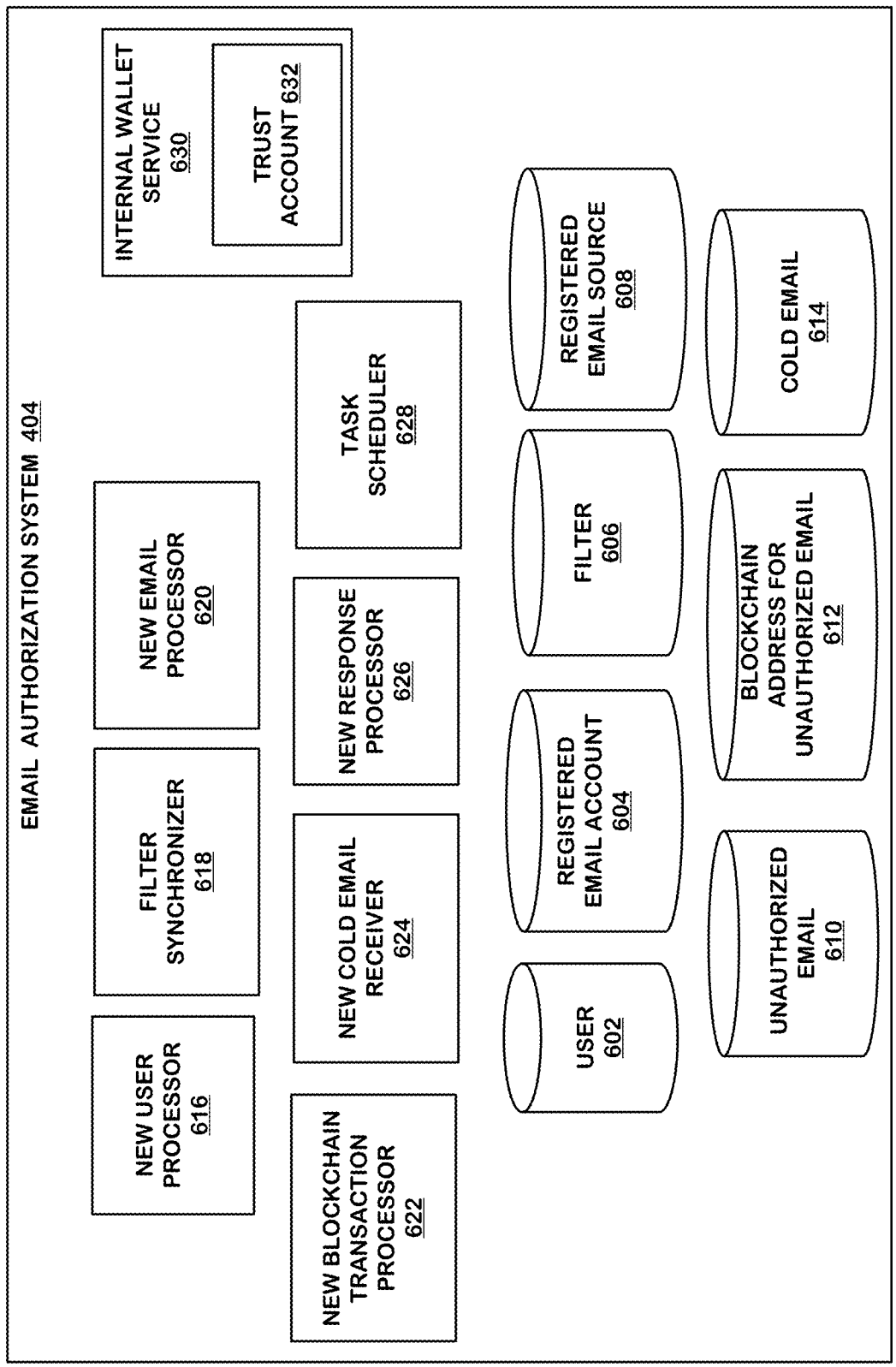
FIG. 6 illustrates an example of an email authorization system.

FIG. 6 illustrates an example of an email authorization system 404. The email authorization system 404 includes software components referred to herein as a new user processor 616, a filter synchronizer 618, a new email processor 620, a new blockchain transaction processor 622, a new cold email receiver 624, a new response processor 626 and a task scheduler 628. These components can be distributed between nodes executing email servers and remote nodes in the network in some embodiments.

The new user processor 616 processes the sign-up process for registration of new email authorization system users to identify and enable monitoring of email channels of registered recipients in the system and to enable the users to send cold emails. The filter synchronizer 618 maintains the filter used for classifying emails as unauthorized, such as by executing a routine that periodically checks for new contacts in user's contact list and email history to be added to user's filter. The new email processor 620 periodically traverses email channels of registered recipients, and classifies new emails using a filter, creates blockchain addresses for each selected email, and causes the sending of a message to the senders of the selected emails prompting the senders to gain authorization for the selected emails by executing blockchain transactions. The new email processor 620 also periodically traverses email channels of email authorization system users, and identifies emails from registered email sources, creates blockchain addresses for each selected email, and validates the selected emails by executing blockchain transactions. The new blockchain transaction processor 622 periodically checks for new blockchain transactions in the blockchain network 416, verifies that the blockchain transaction satisfies the requirements of the prompted transaction and identifies the selected emails as authorized, enabling for example, moving them to users' inboxes if the blocked transactions are verified. The cold email receivers 624 processes cold emails from registered email sources and validates the cold emails for the recipients. The new response processor 626 periodically traverses email channels associated with registered email sources, and identifies responses to sent cold emails, creates blockchain addresses for each responded email, and rewards the recipients for responding to the sent cold emails by executing blockchain transactions. The task scheduler 628 schedules various tasks in the email authorization system 404, such as requesting the filter synchronizer 618 to check for new contacts in users' contact lists and email history, requesting the new email processor 620 to check for new emails, requesting the new blockchain transaction processor 622 to check for new blockchain transactions in the blockchain network 416, and requesting the new response processor 626 to check for new responses to sent cold emails. In some embodiments, the email authorization system 404 may also host an internal wallet service 630 for email authorization system users who wish to store their cryptocurrency balance using the email authorization system 404. In some embodiments, the email authorization system 404 may host a trust account 632 in the internal wallet service 630.

The email authorization system also includes a user database 602, a registered email account database 604, a filter database 606, a registered email source database 608, an unauthorized email database 610 storing emails tagged as unauthorized, a blockchain address for unauthorized email database 612, and a cold email database 614 storing cold emails currently being processed. As used herein, the term "database" does not necessarily imply any unity of structure. For example, two or more separate databases, when considered together, still constitute a "database" as that term is used herein. Databases can include tables. In some embodiments, the user and registered email account data are stored in separate tables within a single database.

FIG. 7 is a symbolic drawing indicating how the user database 602 in FIG. 6 can be organized, according to an embodiment. The user database 602 contains information regarding the email authorization system users. The user database 602 includes a unique user ID 702 for each user, user's name 704, and a parameter (expected token) 706 specifying a characteristic of a blockchain transaction, such as a number or type of tokens or cryptocurrency value, which must be satisfied for authorization of the email for the recipient. In some embodiments, the user database 602 can have separate entries for the first name and surname of the user. As shown in FIG. 7, an example of user entries include user John E. Murphy with user ID 1001 who expects 400 tokens to respond to an email from an unknown sender, user Kristine B. Odaniel with user ID 1004 who expects 100 tokens to respond to an email from an unknown sender, and user Carl N. Brewington with user ID 1005 who expects 2000 tokens to respond to an email from an unknown sender. In some embodiments, a characteristic such as an expected cryptocurrency value or token type or amount (expected token) 706 is set by the user. In some embodiments, the expected characteristic (expected token) 706 is a default set by the email authorization system. In some embodiments, the characteristic (expected token) 706 is adjusted based on user's email traffic or another factors which can, for example, indicate demand for the given recipient. In some embodiments, the user database 602 can include the private keys of any external wallet service/internal wallet 708, e.g., John E. Murphy with user ID 1001 and Carl N. Brewington with user ID 1005. In some embodiments, the user database 602 may include other optional user information 710 that might be helpful for the functionality of the email authorization system 404, e.g., the password for the user account, the timestamp of last sign in, the timestamp for user account creation, user's organization, profile picture, and so on.

FIG. 8 is a symbolic drawing indicating how the registered email account database 604 in FIG. 6 may be organized, according to an embodiment. The registered email account database 604 contains information regarding the email accounts the email authorization system has permission to access for the purpose of executing the authorization service. The registered email accounts database 604 includes a unique email account ID 802 for each email account. The owner of the email account is identified by the owner's user ID 702. The registered email account database 604 further includes a registered email address 804 associated with the email account, and an email account type 806. The email account type 806 specifies the email platform used by the email server hosting the email account. Example email platforms include Novell Groupwise™, Lotus Notes™, Microsoft Exchange Servers™, Sendmail™, Postfix™, Exim™, Gmail™, Hotmail™, and Yahoo! Mail™. In some embodiments, a user may have information for one registered email account, e.g., user Kristine B. Odaniel with user ID 1004 with one email account with email account ID 105 and email address daniel@toprecruiters.com on a Gmail™ email platform, and user Carl N. Brewington with user ID 1005 with one email account with email account ID 106 and email address CarlNBrewington@yahoo.com on a Yahoo! Mail™ email platform. In some embodiments, a user may have information for two or more registered email accounts, e.g., user John E. Murphy with user ID 1001 with one email account with email account ID 101 and email address JohnEMurphy@teleworm.us on a Outlook™ email platform, and one email account with email account ID 102 with email address JohnEMurphy@gmail on a Gmail™ email platform. In some embodiments, the user's email account might be hosted on an unconventional email platform; for such email accounts, Internet Message Access Protocol (IMAP) and SMTP URLs are stored. In some embodiments, the registered email account database 604 may further include other optional information 808 that might be helpful for the functionality of the email authorization system 404, e.g., last time contact list from the particular email account was synched with the user's filter, timestamp for account creation, last time account was updated and so on.

FIG. 9 is a symbolic drawing indicating how the filter database 606 in FIG. 6 may be organized, according to an embodiment. The filter database 606 contains information regarding a user's filter for each user in the email authorization system 404. A user's filter is composed using identifying parameters associated with emails. The identifying parameters can include components in an email message header, e.g., sender email address, email address domain, IP address from which the email originated, etc. In some embodiments, a user's filter can be composed of email addresses, domains already included in user's contact list in the user email account. Emails from the known contacts in the filter database 606 can be automatically forwarded to the users' email inboxes. The filter database 606 includes allowed email address 902 for a user identified by user ID 702. In some embodiments, a user may also include certain domains, e.g., user Kristine B. Odaniel with user ID 1004 allows any email from the domain yahoo.com. In some embodiments, any information in an email's message header can be included in a user's filter in the filter database 606.

In some embodiments, the filter database 606 may further include other optional information 904 that might be helpful for the functionality of the email authorization system 404, e.g., timestamp for when the filter entry was created, timestamp for when the filter entry was last updated, whether the filtered member has been notified by email of inclusion in the user's filter and so on.

FIG. 10 is a symbolic drawing indicating how the registered email source database 608 in FIG. 6 may be organized, according to an embodiment. The registered email source database 608 contains information identifying parameters of registered email sources. Each email source entry in the registered email source database 608 is composed using identifying parameters associated with emails. The identifying parameters can include components in an email message header, e.g., sender email address, email address domain, IP address from which the email originated, etc. Emails from the known cold email senders in the registered email source database 608 can be automatically validated as genuine by the email authorization system 404. The registered email source database 608 includes allowed email source 1002 for a user identified by user ID 702. In some embodiments, an email source may also include certain domains, e.g., user Top Recruiters, INC. with user ID 1007 has listed the domain toprecuiter.com as its email source. Any email from the domain toprecuiter.com will be validated as genuine by the email authorization system 404. In some embodiments, the registered email source database 608 may further include other optional information 1004 that might be helpful for the functionality of the email authorization system 404, e.g., the timestamp for when the registered email source entry was created, the timestamp for when the registered email source entry was last updated and so on.

FIG. 11 is a symbolic drawing indicating how the unauthorized email database 610 in FIG. 6 is organized, according to an embodiment of the invention. The unauthorized email database 610 contains information regarding tagged, unauthorized emails from the users' registered email accounts. The unauthorized email database 610 identifies each unauthorized email with an email ID 1102. The unauthorized email database 610 further includes the email subject 1104, the email account ID 802 of the registered email account from which the email authorization system retrieved the email, the email sender's address 1106, the current folder 1108 in which the unauthorized email resides on the originating email server, and whether the blockchain transaction (token) has been received 1110 and verified, that is required to release the blocked, unauthorized email. In some embodiments, blocked, unauthorized emails are kept in an "unauthorized" folder (alternatively labeled "unpaid" folder when the blockchain transaction includes a transfer of cryptocurrency) at the email server end. In some embodiments, the unauthorized email database 610 may further include other optional information 1112 that might be helpful for the functionality of the email authorization system 404, e.g., timestamp for when the email entry was created, timestamp for when the email entry was last updated, whether the message prompting the sender to authenticate the email has been delivered, and so on. As shown in FIG. 11, spam emails such as the email with subject "GET PAID $500/hr" with email ID 1 and the email with subject "*FREE VACATION*" with email ID 3 are rarely authenticated by their senders, and the email authorization system 404 does not authorize their release to the recipients' email inbox. However, genuine cold emails such as the email with subject "Invitation to join ACM Artificial Intelligence Committee" with email ID 4 have been validated by the sender with email address "ProfDoLittle@cs.umn.edu," and the email authorization system 404 has authorized its release to the recipient's email inbox.

FIG. 12 is a symbolic drawing indicating how the blockchain address for unauthorized email database 612 in FIG. 6 is organized, according to an embodiment of the invention. The blockchain address for unauthorized email database 612 includes the email ID 1102 for each unauthorized email, the email blockchain address 1202 being created by the email authorization system 404, and whether a blockchain transaction with the corresponding blockchain address has been made 1204. In some embodiments, the blockchain address for unauthorized email database 612 may further include other optional information 1206 that might be helpful for the functionality of the email authorization system 404.

FIG. 13 is a symbolic drawing indicating how the cold email database 614 in FIG. 6 is organized, according to an embodiment of the invention. The cold email database 614 contains information regarding cold emails received from registered email sources. The cold email database 614 identifies each cold email with an email ID 1302. The cold email database 614 further includes the recipient's email address 1304, the email account ID 802 of the registered email account from which the email authorization system received the email, the first blockchain address 1306 of the first executed blockchain transaction, a parameter (expected token) 1308 specifying a characteristic of the first blockchain transaction, such as a number or type of tokens or cryptocurrency value, which will be rewarded to the recipient as an incentive to respond to the cold email, whether the first blockchain transaction (token) that is required to validate the cold email has been received and verified 1310, and whether the recipient of the cold email have responded to the cold email 1312. In some embodiments, the cold email database 614 may further include other optional information 1314 that might be helpful for the functionality of the email authorization system 404, e.g., timestamp for when the cold email entry was created, timestamp for when the cold email entry was last updated, whether a message informing the recipient of the incentive to respond to the cold email has been delivered, and so on. As shown in FIG. 13, cold emails such as the email with recipient email address JognKelly@yahoo.com with email ID 1 have been validated by the email authorization system 404 through the execution of the first blockchain transaction and delivered to the recipient email inbox folder. However, the recipient still has not responded to the email.

FIG. 14 is a symbolic drawing indicating how the internal wallet service 630 in FIG. 6 is organized, according to an embodiment of the invention. The internal wallet service 630 maintains a record of blockchain transactions and other transactions associated with blockchain transactions for users of the email authorization system's internal wallet service. Each transaction is associated with a user ID 702, a blockchain address 1404, the private key(s) 1406 associated with the blockchain address 1404 and the amount of token involved in the transaction 1402. When a transaction is executed, the blockchain address 1404 associated with the transaction and corresponding encryption private keys 1406 of the blockchain address is recorded in the internal wallet service 630. The cryptocurrency balance of each user using the service of the internal wallet service 630 can be determined by summing up the tokens in transactions associated with his/her user ID 702. In some embodiments, the internal wallet service 630 may further include other optional information 1408 that might be helpful for the functionality of the email authorization system 404. As shown in FIG. 14, user ID 1007 has deposited 500 tokens in the internal wallet service 630 by executing a blockchain transaction associated with the blockchain address NcuCbHEf3W. Other than the internal wallet service 630 of the email authorization system 404, private keys can be stored in desktop wallets (wallet service available on that particular machine the wallet service has been installed), cloud wallets (wallet service hosted by a third party), mobile wallets (any wallet that exists on a device that will ever connect to the internet), hardware wallets (physical devices), paper wallets (printing out the private keys on a piece of paper which will then be stored in a secure place).

Sign Up Process for a New Email Authorization System User

Figure 15:
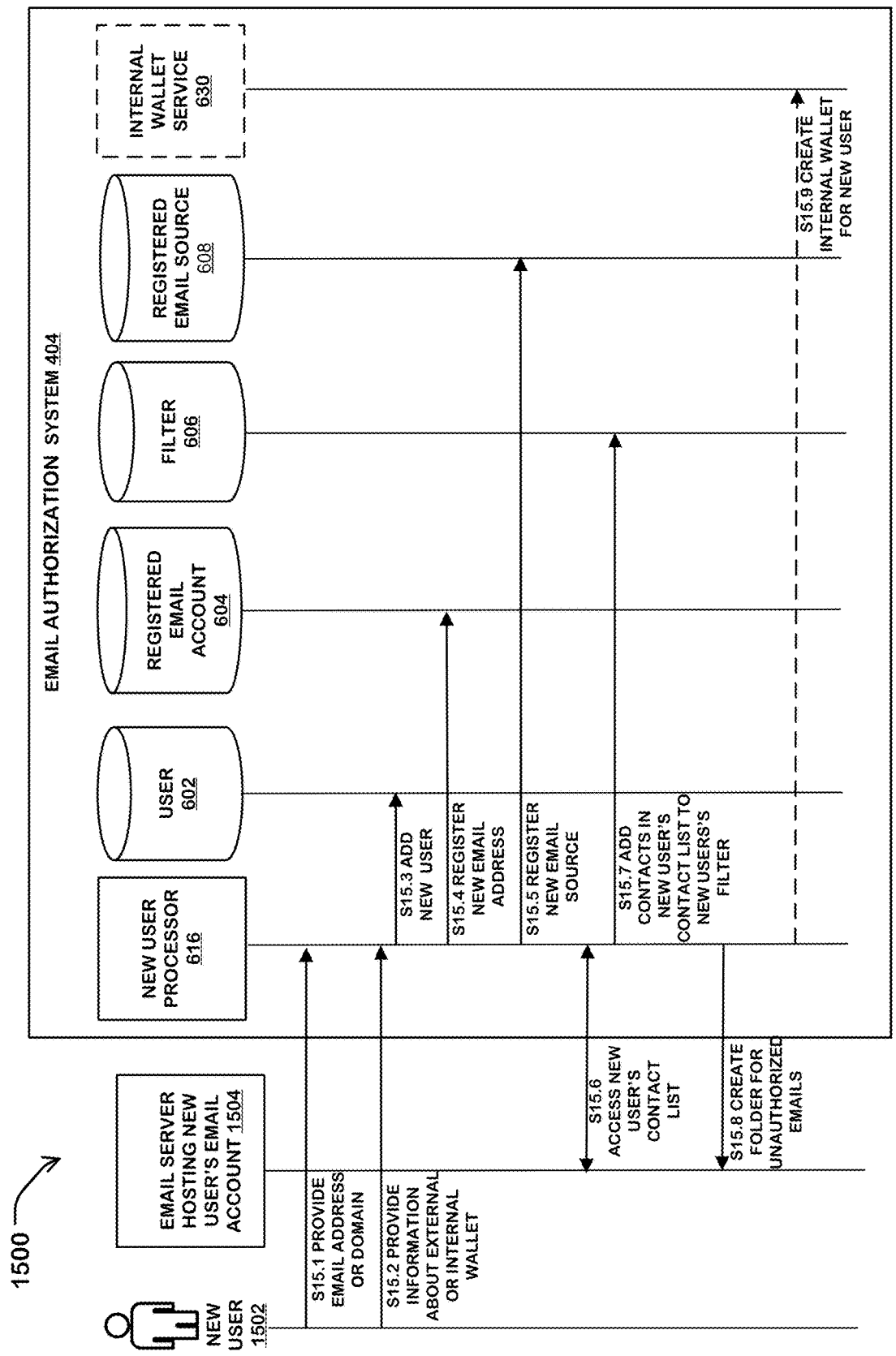
FIG. 15 is a sequence diagram illustrating a representative method of processing a new user in the email authorization system by the new user processor in FIG. 6.

FIG. 15 is an example workflow 1500 illustrating a representative method of registering a new user by a new user processor in the email authorization system 404 by the new user processor 616 in FIG. 6. In some embodiments, the actions in the workflow may be performed in different orders and with different, fewer or additional actions than those illustrated in FIG. 15. Multiple actions can be combined in some implementations.

FIG. 15 includes workflow 1500 that begins at step S15.1, when a new user 1502 signs up by providing an email account, the email server information associated with the email account and the email source that will identify the user as a genuine cold email sender to the new user processor 616 in the email authorization system 404. In some embodiments, the email authorization system 404 will be able to detect the email server information automatically by the email address provided by the new user 1502. In some embodiments, the new user 1502 may provide information about more than one email account and more than one email source.

Workflow 1500 continues at step S15.2, the new user 1502 provides information about an external wallet to the new user processor 616 in the email authorization system 404, or the user might submit a request for an account in the email authorization system's internal wallet. At step S15.3, the new user processor 616 adds the new user's 1502 information to the user database 602. At step S15.4, the new user processor 616 adds the email account(s) information of the new user 1502 to the registered email account database 604. At step S15.5, the new user processor 616 adds the email source identifying the user as a genuine cold email sender in the registered email source database 608. At step 15.6, the new user processor 616 accesses the email server 1504 hosting the new user's email account for the new user's contact list. At step S15.7, the new user processor 616 adds the contacts and domains in the new user's contact list to the user's filter in the filter database 606. The added filter database entries can be identified by the user ID of the new user. At step S15.8, the new user processor 616 creates a folder for authorized emails in the new user's email account hosted in email server 1504. At step S15.9, if requested by the new user 1502, the new user processor 616 creates an internal wallet account for the new user 1502 in the internal wallet service 630.

Filter Synchronization

Figure 16:
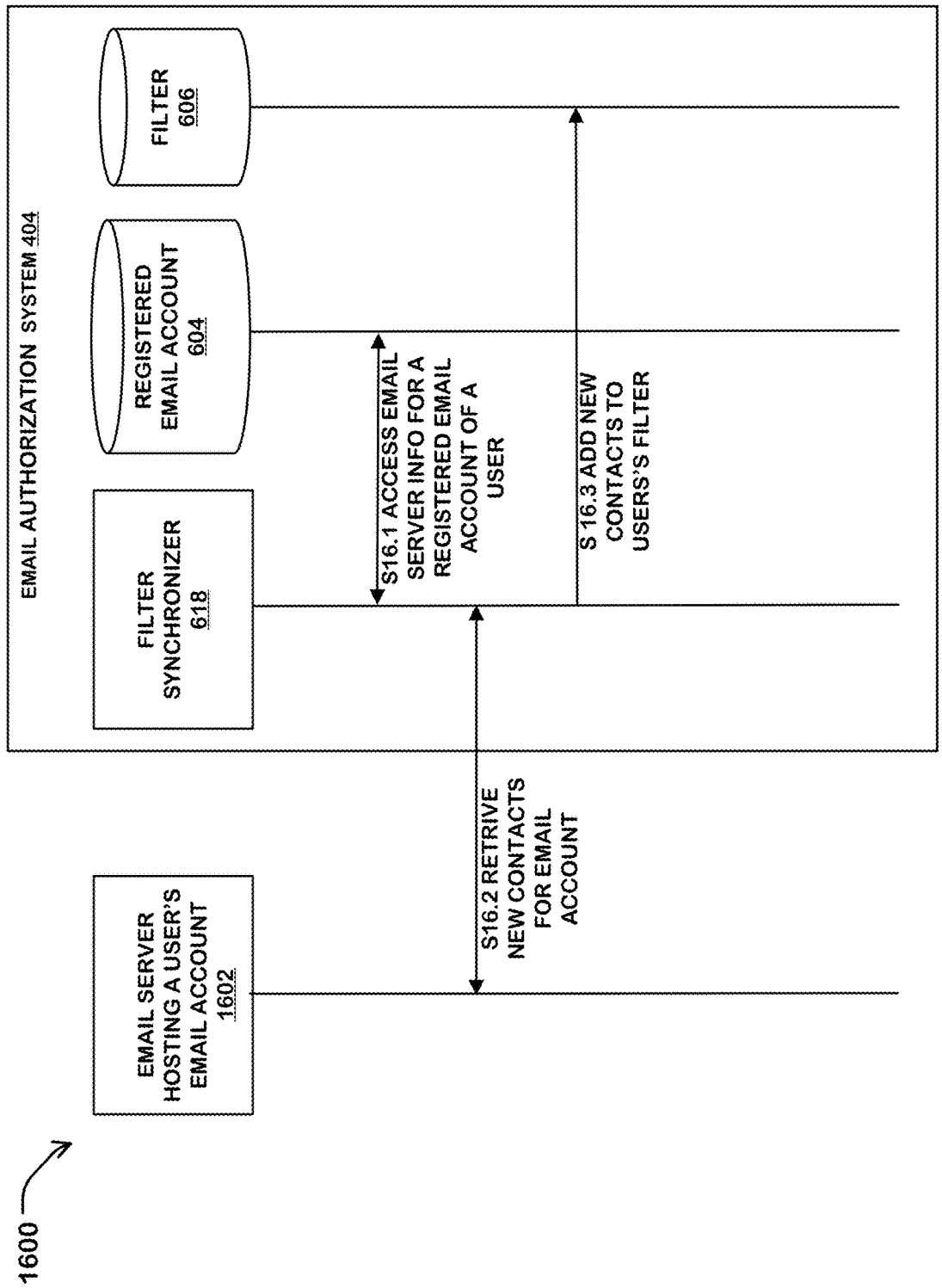
FIG. 16 is a sequence diagram illustrating a representative method of synching a user's filter with users' contact lists by the filter synchronizer in FIG. 6.

FIG. 16 is an example workflow 1600 illustrating a representative method of synching a user's filter in the filter database 606 with users' contact lists located in the user email account by the filter synchronizer 618 in FIG. 6. In some embodiments, the actions in the workflow may be performed in different orders and/or with different, fewer or additional actions than those illustrated in FIG. 16. Multiple actions can be combined in some implementations.

FIG. 16 includes workflow 1600 that begins at step S16.1 where the filter synchronizer 618 in the email authorization system 404 accesses the registered email account database 604 to access email account and server information for a registered user's email account in the registered email account database 604. Workflow 1600 continues at step S16.2 where the filter synchronizer 618 retrieves information about new contacts from a user's contact list and email history on the email server 1602 hosting the user's email account. At step S16.3, the filter synchronizer 618 adds the newly retrieved contacts from the user's contact list to the user's filter in the filter database 606. The added entries in the filter database 606 can be identified by the user ID of the owner of the email account.

Processing of New Incoming Emails

Figure 17:
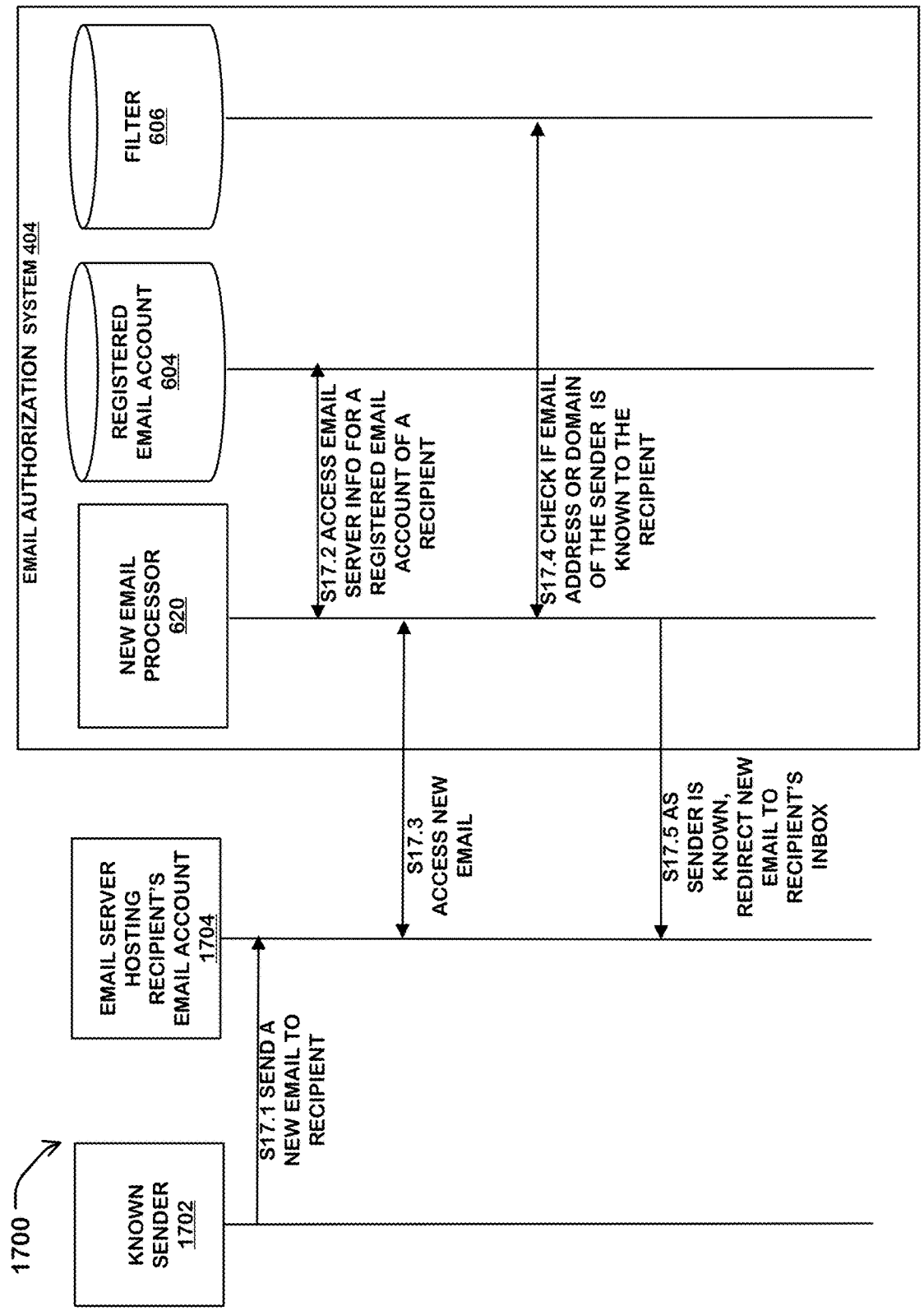
FIG. 17 is a sequence diagram illustrating a representative method of processing an email from a known sender by the new email processor in FIG. 6.

FIG. 17 is an example workflow 1700 illustrating a representative method of processing an email from a known sender by the new email processor 620 in the email authorization system 404. In some embodiments, the actions in the workflow may be performed in different orders and/or with different, fewer or additional actions than those illustrated in FIG. 17. Multiple actions can be combined in some implementations.

FIG. 17 includes workflow 1700 that begins at step S17.1 when an email sender 1702 sends an email to a recipient. As used herein, a "recipient" is an email authorization system user, who has one or more email accounts registered with the system. The sender 1702 is known to the recipient as the sender's information is already included in the recipient's contact list and filter. The email is saved in a message folder, such as an inbox, for the recipient's email account on the email server 1704. Workflow 1700 continues at step S17.2 where the new email processor 620 accesses recipient's email account information in the registered email account database 604. At step S17.3, the new email processor 620 accesses the recipient's email account hosted by the email server 1704 with the email account information retrieved at step S17.2. The email from the known sender 1702 from step S17.1 is included among the new emails. At step S17.4, the new email processor 620 applies the filter to the new emails in the email channel to check whether the known sender's email address or email address domain is listed in the recipient's filter stored in the filter database 606. As the sender's email address or email address domain is included in the filter database 606, the new email processor 620 in the email authorization system 404 can then redirect the email to the email inbox folder of the recipient's email account in the email server 1704 at step S17.5.

Figure 18:
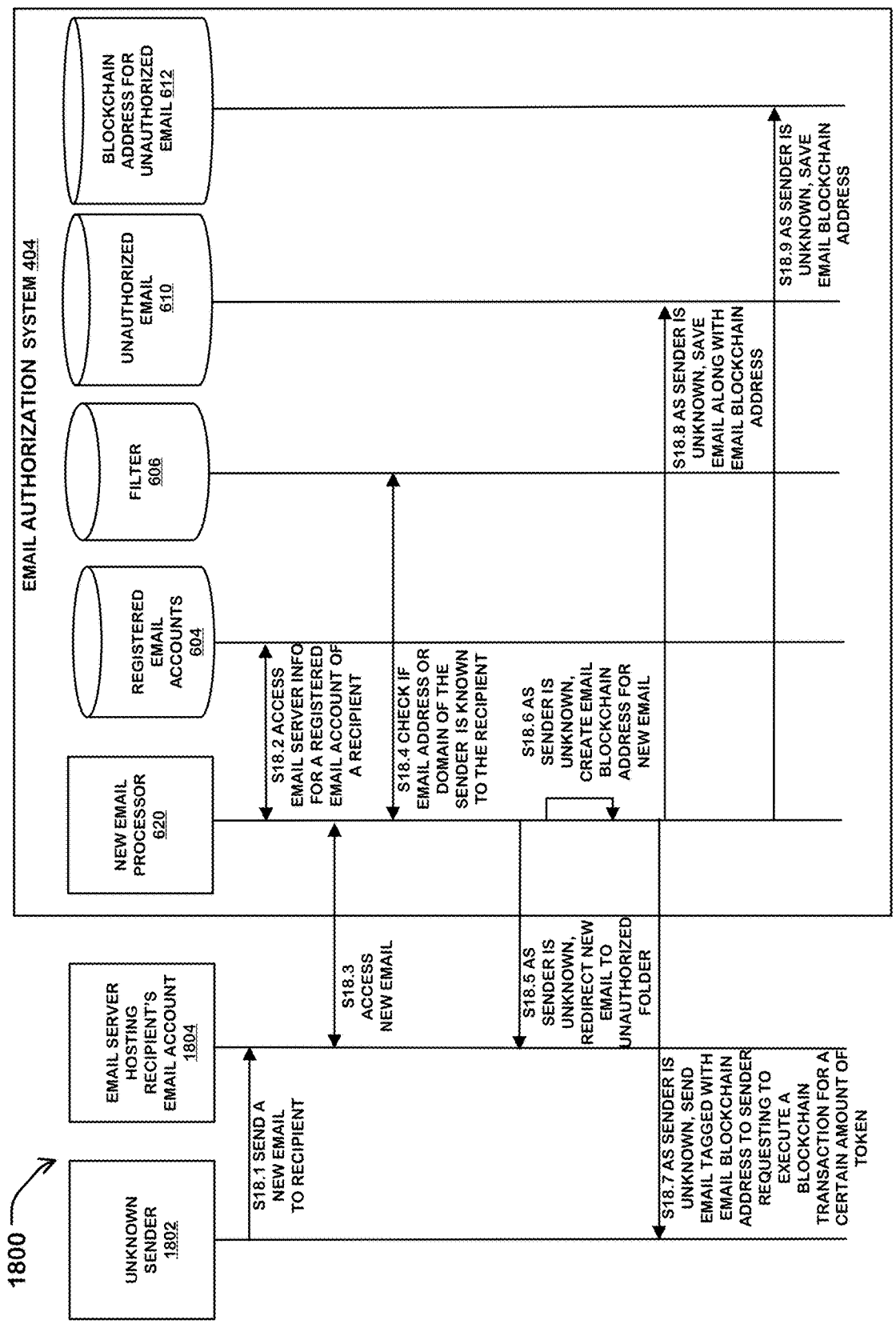
FIG. 18 is a sequence diagram illustrating a representative method of processing an email from an unknown sender by the new email processor in FIG. 6.

FIG. 18 is an example workflow 1800 illustrating a representative method of processing an email from an unknown sender (e.g., an email selected using the filter) by the new email processor 620 in the email authorization system 404. In some embodiments, the actions in the workflow may be performed in different orders and/or with different, fewer or additional actions than those illustrated in FIG. 18. Multiple actions can be combined in some implementations.

FIG. 18 includes workflow 1800 that begins at step S18.1 when an unknown email sender 1802 sends an email to a recipient. The email is delivered to the email channel of the recipient email account, in which in some embodiments it is saved in a message folder for the recipient's email account on the email server 1804. Workflow 1800 continues at step S18.2 when the new email processor 620 accesses recipient's email account information in the registered email account database 604. At step S18.3, the new email processor 620 accesses the recipient email account hosted by the email server 1804 with the email account information retrieved at step S18.2. The email from the unknown sender 1802 from step S18.1 is included among the new emails. At step S18.4, the new email processor 620 checks whether the sender's email address or email address domain is listed in the recipient's filter stored in the filter database 606. As the sender's email address or email address domain is not included in the filter database 606, the new email processor 620 in the email authorization system 404 classifies the email as unauthorized. The selected email classified as unauthorized is redirected in this example to an unauthorized email folder of the recipient's email account on the email server 1804 at step S18.5. At step S18.6, the new email processor 620 creates a new blockchain address for the email. At step S18.7, the new email processor 620 sends, or causes the email server to send, an email or message tagged with the blockchain address created at step S18.6 to unknown sender 1802 and prompts execution of a certain transaction having specified characteristics, such as an amount of cryptocurrency, to enable the tagged email to be authorized for the recipient. In some embodiments, the new email processor 620 causes the email or message to be sent from email server 1804 having the recipient's email addresses as a sender address. In another embodiment, the new email processor 620 causes the email or message to be sent to the unknown sender on behalf of the email authorization system 404. At step S18.8, the new email processor 620 saves the email in the unauthorized email database 610. At step S18.9, the new email processor 620 saves the blockchain address created at step S18.6 in the blockchain address for unauthorized email database 612.

Figure 19:
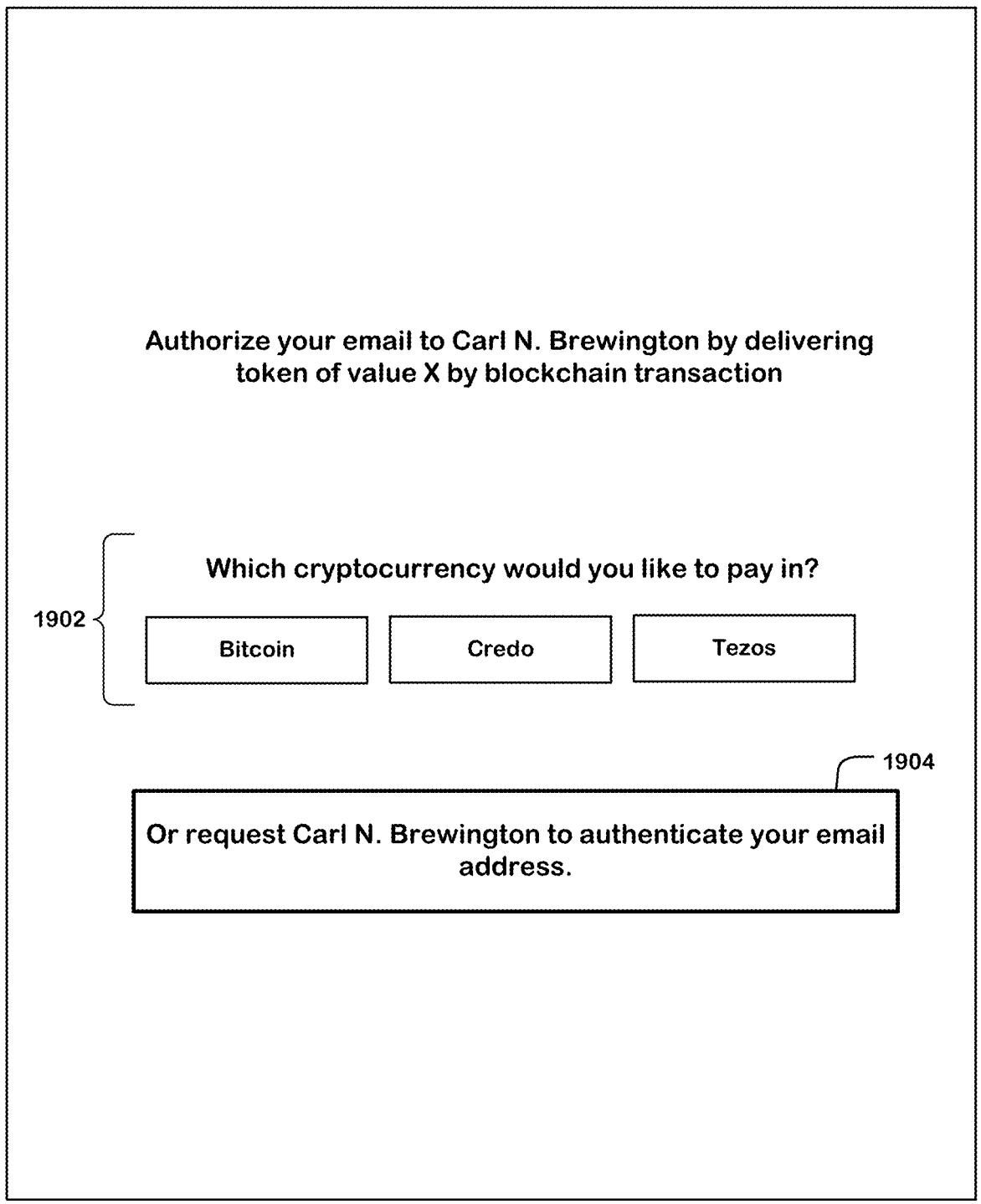
FIG. 19 illustrates an example message to an unknown sender prompting execution of a blockchain transaction in accordance with an implementation.

FIG. 19 illustrates an example message 1900 returned to the sender of tagged emails, prompting execution of a blockchain transaction in accordance with an implementation. The transaction can be prompted by text or icons in the email, with an associated link to tools, such as a web interface to a transaction composition engine, or a widget when selected causes initiation of code that composes the transaction or messages required to execute the transaction. The message 1900 prompts the unknown sender to validate the email by executing a blockchain transaction, such as transferring a certain number of tokens or amount of cryptocurrency to a blockchain address assigned to the tagged email, and logged by the email recipient. The prompts can include links to more than one type of blockchain transaction, such as transactions using available alternative types of cryptocurrencies 1902, reflected by tags in message 1900 in this example, and included in the illustrated example icons for Bitcoin™, Credo™, and Tezos™. The message carries an active link to tools that can execute the blockchain transaction, that is selected by selecting a chosen one of the types of cryptocurrency. Thus, characteristics of the blockchain transaction in this example include an amount of cryptocurrency of one of the available types shown in the message, and a value of the cryptocurrency. The message 1900 also carries the blockchain address, or a link to the blockchain address, created by the new email processor 620. The sender can opt to complete the blockchain transaction using the linked tools. The linked tools can enable the use of an internal or external wallet service. The blockchain transaction includes adding a record of the blockchain transaction into the blockchain ledgers in the blockchain network 416 with the tagged blockchain address.

The message also includes a link to a tool 1904 that causes sending of a request from the sender of the tagged email to the recipient, requesting that the sender's email account be added to the filter to enable delivery to the recipient without requiring execution of the blockchain transaction. In some embodiments, the request can be included in a blockchain transaction using the address of the tagged email. The authorization server can include a process for composing return emails linked to the individual blockchain addresses, and having the recipient email addresses identified as sender addresses in the return emails, as the messages are returned to senders.

Processing of New Blockchain Transactions

Figure 20:
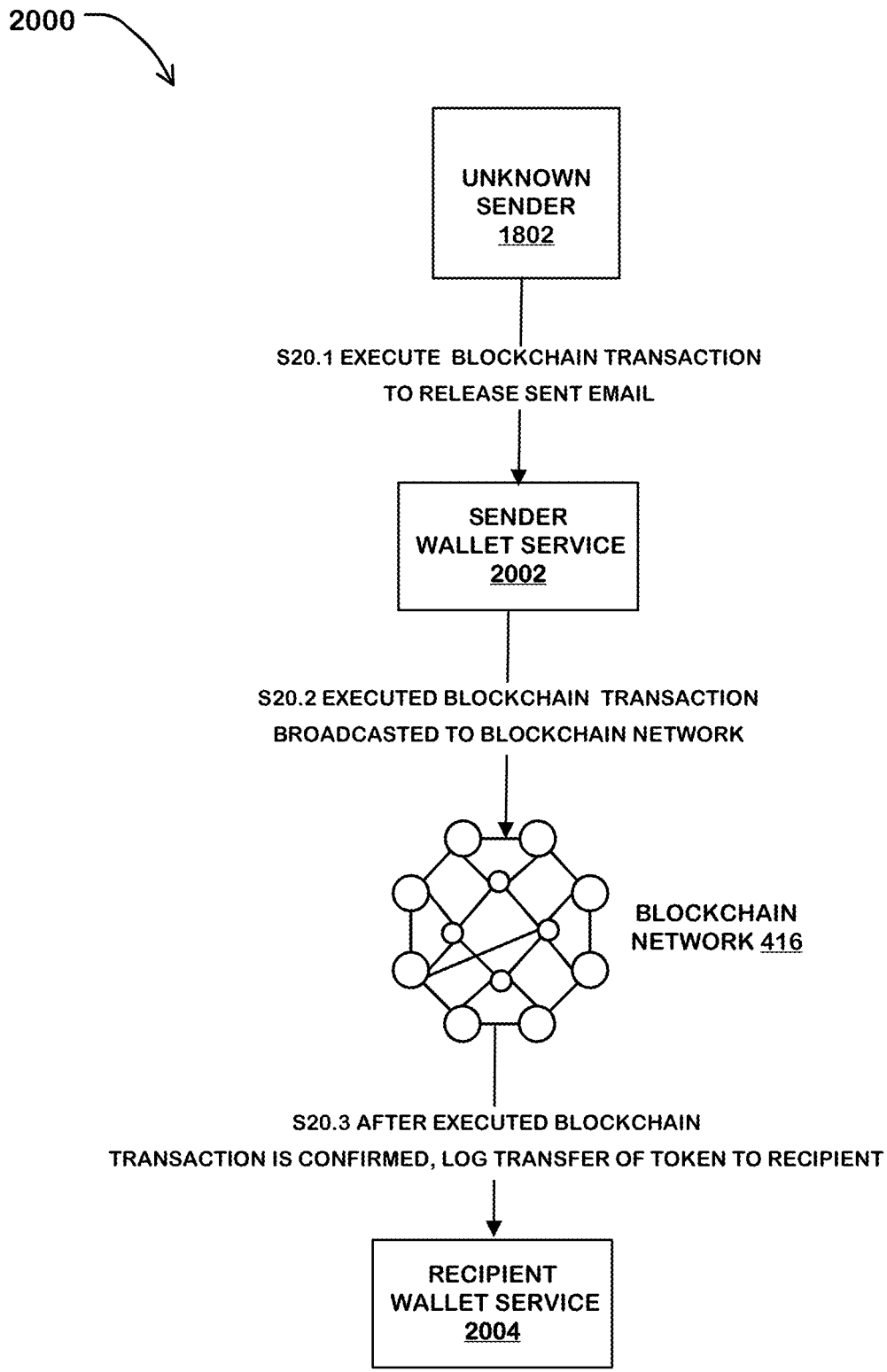
FIG. 20 illustrates a representative method of completing a blockchain transaction to authorize the release of an email.

FIG. 20 illustrates a representative method 2000 for the unknown sender 1802 to complete a blockchain transaction to authorize the release of the tagged email. At step S20.1, the unknown sender 1802 completes the blockchain transaction through the sender wallet service 2002. In one embodiment, the unknown sender 1802 may use the service of an external wallet. In one embodiment, the unknown sender 1802 may be an email authorization system user and may use the internal wallet service 630 of the email authorization system 404. The sender wallet service 2002 broadcasts the blockchain transaction to the blockchain network 416 at step S20.2. The blockchain transaction is entered into the blockchain ledgers in the blockchain network 416. After the blockchain transaction is verified in a blockchain network 416, the transfer of the cryptocurrency is logged in the recipient's wallet 2004 at step S20.3. In one embodiment, the recipient may use the service of an external wallet. In one embodiment, the recipient may use the internal wallet service 630 of the email authorization system 404. For clarity's sake, network(s) 418 is not included in FIG. 20.

Figure 21:
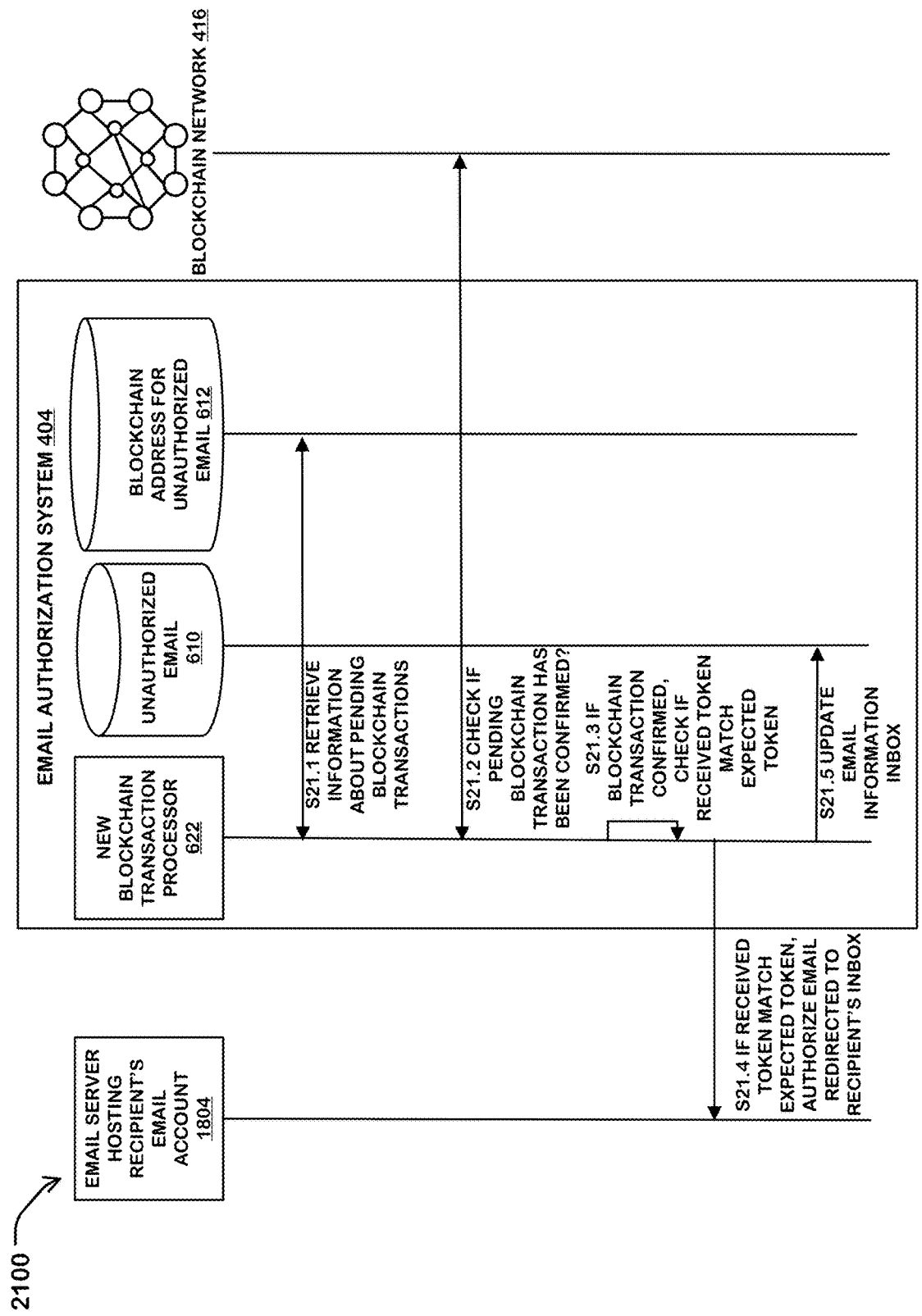
FIG. 21 is a sequence diagram illustrating a representative method of processing new blockchain transactions in the email authorization system by the new transaction processor in FIG. 6.

FIG. 21 is an example workflow 2100 illustrating a representative method of processing new blockchain transactions in the blockchain network 416 by the new blockchain transaction processor 622 in the email authorization system 404. In some embodiments, the actions in the workflow may be performed in different orders and/or with different, fewer or additional actions than those illustrated in FIG. 21. Multiple actions can be combined in some implementations.

FIG. 21 includes workflow 2100 that begins at step S21.1, when the new blockchain transaction processor 622 retrieves information about pending blockchain transactions and or/recently confirmed blockchain transactions from the blockchain address for unauthorized email database 612, including blockchain addresses of the pending transactions, of recently confirmed transaction, or of both. The Workflow 2100 continues at step S21.1 where the new blockchain transaction processor 622 checks the blockchain ledgers in the blockchain network 416 to determine whether any pending or recently confirmed blockchain transaction has been confirmed against the retrieved blockchain addresses in unauthorized email database 610. At step S21.3, if a pending or recently confirmed transaction has been confirmed, the blockchain transaction processor 622 checks if the token is received, or other characteristics required, from the completed blockchain transaction matching the expected token of the email recipient. At step S21.4, if the token received from the completed blockchain transaction matches the expected token, the new blockchain transaction processor 622 marks the email as authorized. The email server can then transfer the authorized email to a designated message folder such as the recipient's primary email inbox in the recipient's email account in email server 1804. At step S21.5, the new blockchain transaction processor 622 updates the information for the authorized email in the unauthorized email database 610 to specify that the blockchain transaction has been completed and the email has been released.

In some embodiments, the new blockchain transaction processor 622 may get a notification from the unknown sender's wallet service or the recipient's wallet service that a blockchain transaction has been completed. In such cases, the blockchain transaction processor 622 may check if the token received from the completed blockchain transaction matches the expected token of the email recipient. If the token received, or other characteristics required, from the completed blockchain transaction matches the expected characteristic, the new blockchain transaction processor 622 marks the email as authorized, and the authorized email can be moved from the unauthorized folder to the recipient's email inbox in the recipient's email account.

Processing of Received Cold Emails

Figure 22:
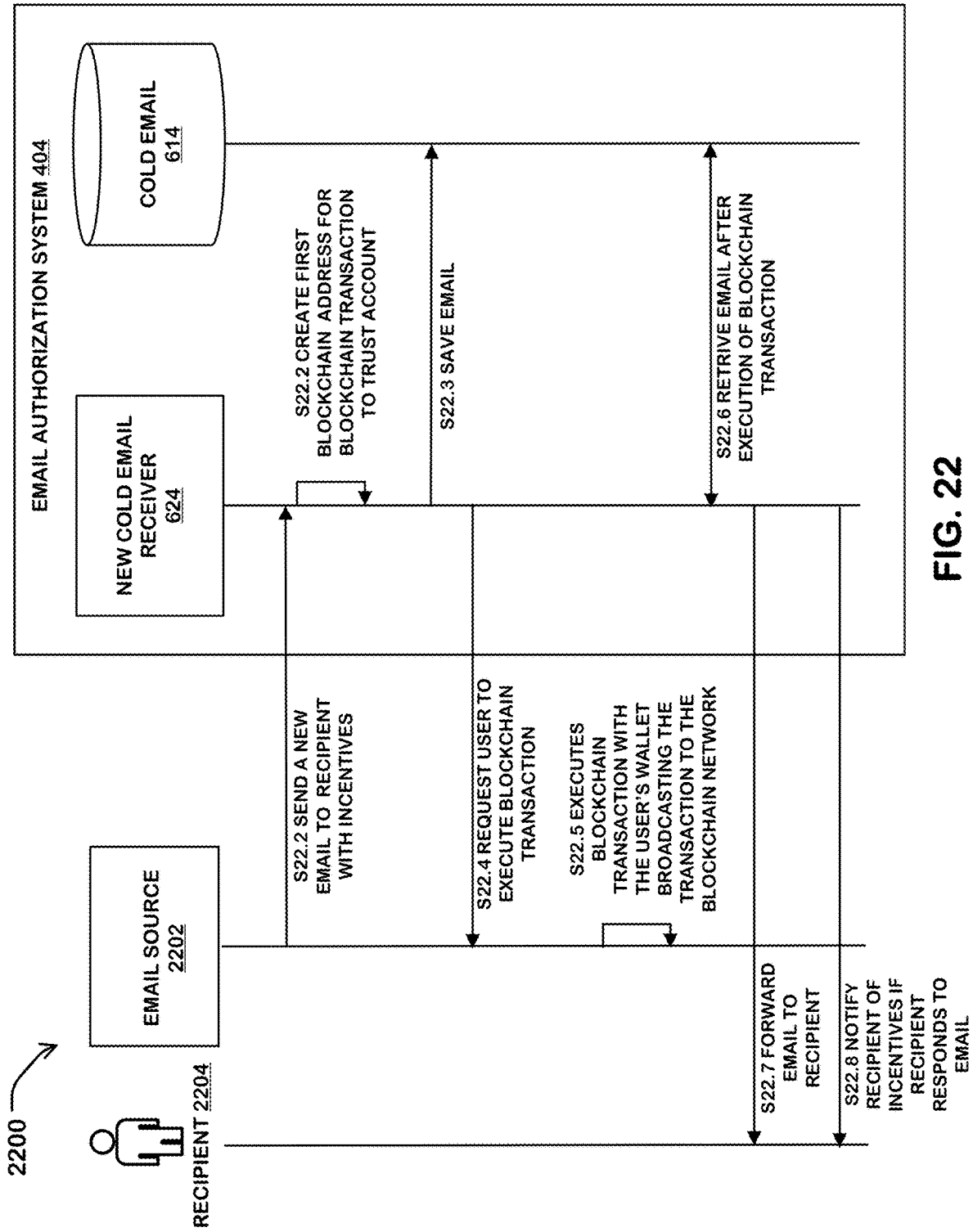
FIG. 22 is a sequence diagram illustrating a representative method of processing a cold email by the new cold email processor in FIG. 6.

FIG. 22 is an example workflow 2200 illustrating a representative method processing a cold email by the new cold email receiver 624 in the email authorization system 404 in FIG. 6. In some embodiments, the actions in the workflow may be performed in different orders and with different, fewer or additional actions than those illustrated in FIG. 22. Multiple actions can be combined in some implementations.

FIG. 22 includes workflow 2200 that begins at step S22.1 when an email source 2202 in the email authorization system 404 forwards a cold email to the new cold email receiver 624. In some embodiments, the cold email is associated with a specific amount of tokens the recipient will receive as an incentive to respond to the cold email.

Workflow 2200 continues at step S22.2 where the new cold email receiver 624 creates a first blockchain address for the cold email. The first blockchain address is created with the private key of the email source and the private key of the trust account 632 in the internal wallet service 630. At step S22.3, the new cold email receiver 624 adds the cold email information to the cold email database 614 along with the first blockchain address of the first blockchain transaction. At step S22.4, the cold email receiver 624 requests the email source 2202 to execute a first blockchain transaction associated with the first blockchain address. In another embodiment, the new cold email receiver 624 causes an email or message to be sent to the email source 2202 on behalf of the email authorization system 404 requesting the email source to validate the cold email by executing a first blockchain transaction. At step S22.5, the email source 2202 executes the first blockchain transaction to validate the cold email as genuine. In one embodiment, the email source 2202 may execute the first blockchain transaction through the email authorization system 404. In another embodiment, the email source 2202 may execute the first blockchain transaction through the sender's digital wallet. The first blockchain transaction is broadcasted to a blockchain network, specifying the first blockchain address and the characteristics of the transaction, such as an incentive associated with the cold email has been transferred to the trust account 632 in the internal wallet service 630 of the email authorization system 404. The email source informs the new cold email receiver 624 of the first executed blockchain transaction. At step S22.6, if a pending first blockchain transaction has been completed, the new cold email receiver 624 retrieves the validated cold email from the cold email database 614 and transfers the validated cold email to a designated message folder such as the recipient's primary email inbox in the recipient's (2204) email account in email server at step S22.7. At step S22.8, the new cold email receiver 624 notifies the recipient 2204 of the incentives associated with responding to the sent cold email.

Figure 23:
FIG. 23 illustrates an example user interface screen to compose a cold email in accordance with an implementation

FIG. 23 illustrates an example user interface (UI) screen 2300 to compose a cold email in accordance with an implementation. The composer of the cold email may add recipients of the cold email in the UI field 2302, include a subject for the cold email in the UI field 2304 and draft a message to the recipients in the UI field 2306. The UI screen 2300 prompts the composer to specify an incentive token in the UI field 2308 that will be rewarded to the recipient if he/she responds to the cold email.

Figure 24:
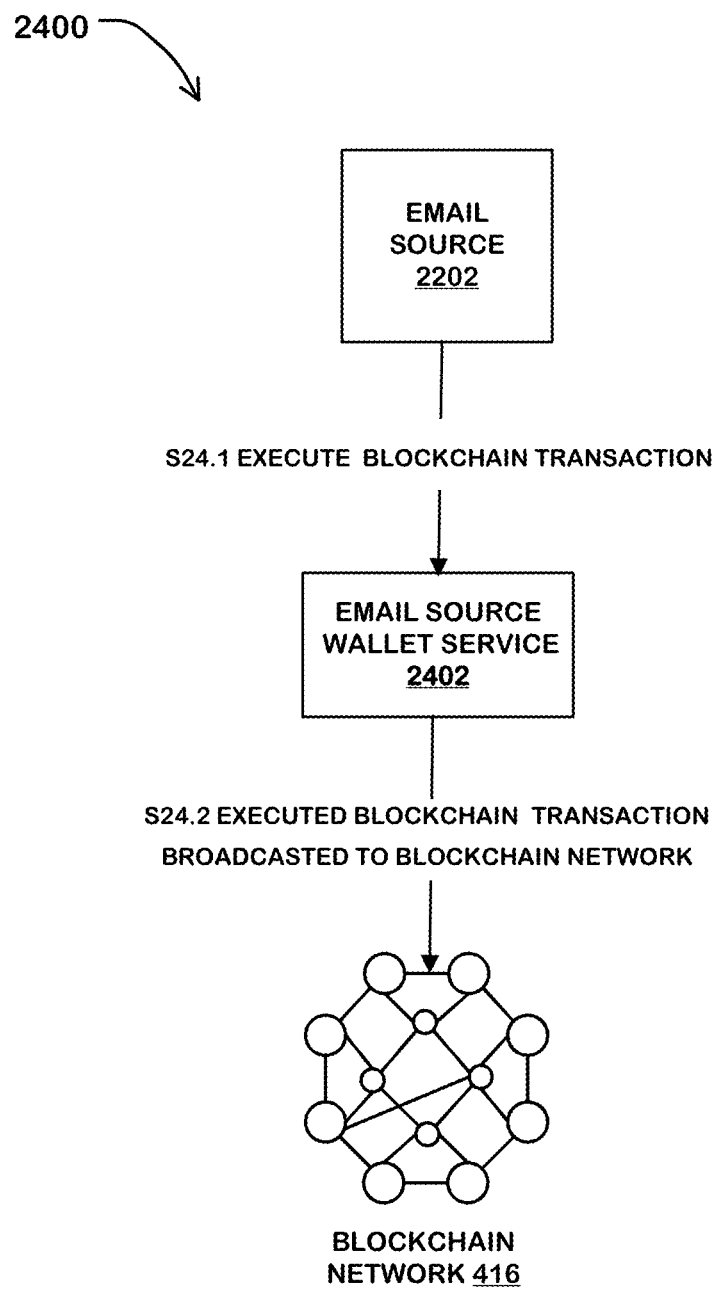
FIG. 24 illustrates a representative method of completing a blockchain transaction to validate a cold email.

FIG. 24 illustrates a representative method 2400 of completing a first blockchain transaction by an email source 2202. At step S24.1, the email source 2202 completes the blockchain transaction through a wallet service 2402 associated with the email source. In one embodiment, the email source wallet service 2402 may be an external wallet. In one embodiment, the email source wallet service 2402 may be the internal wallet service 630 of the email authorization system 404. The email source wallet service 2402 broadcasts the blockchain transaction to the blockchain network 416 at step S24.2. The blockchain transaction is entered into the blockchain ledgers in the blockchain network 416. After the blockchain transaction is verified in a blockchain network 416, the transfer of the cryptocurrency is logged in the trust account 632 in the internal wallet service 630 of the email authorization system 404. For clarity's sake, network(s) 418 is not included in FIG. 24.

Processing of Responses to Cold Emails

Figure 25:
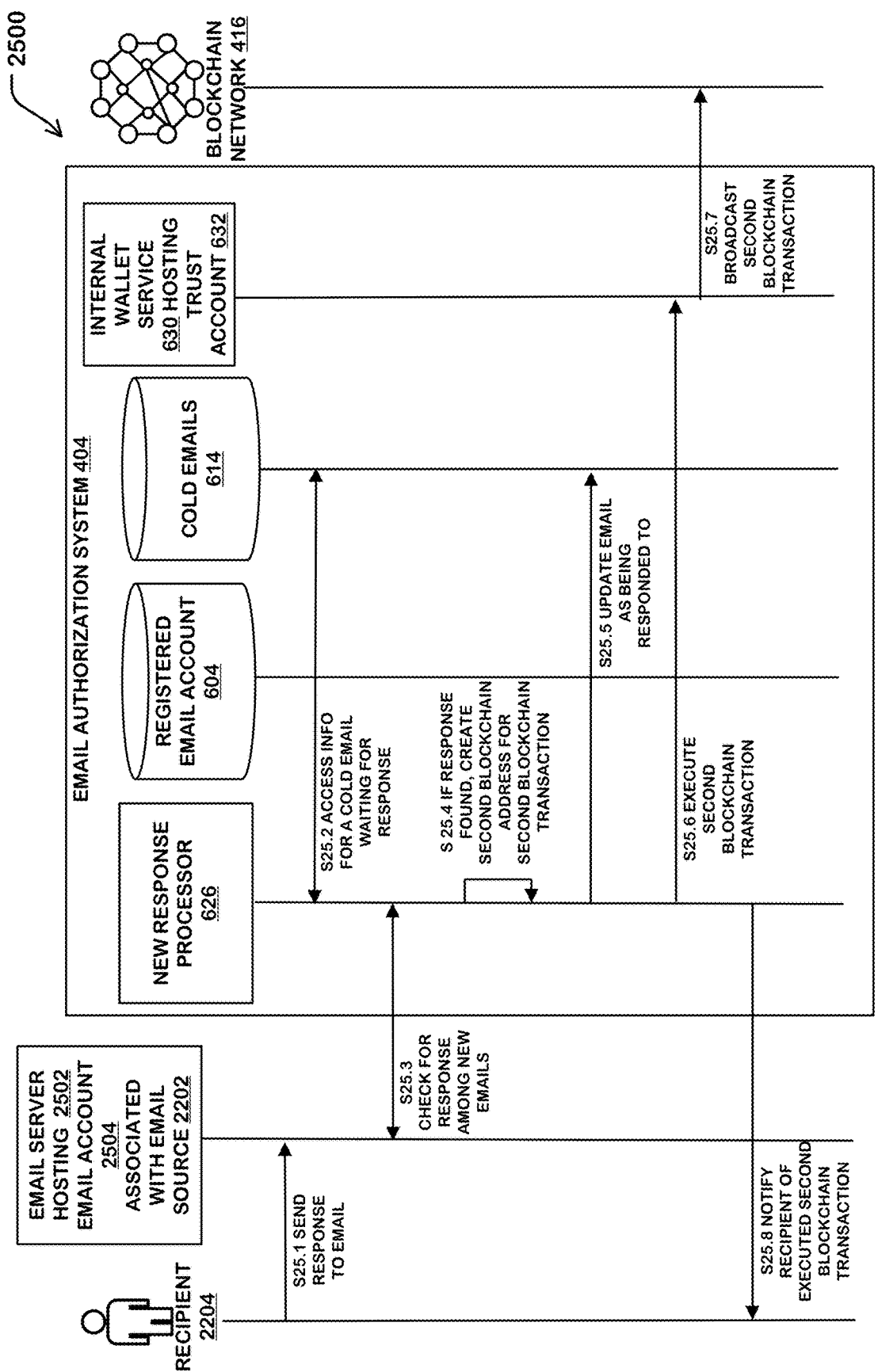
FIG. 25 is a sequence diagram illustrating a representative method of processing a response to a cold email by the new response processor in FIG. 6.

FIG. 25 is an example workflow 2500 illustrating a representative method of processing a response to a cold email by the new response processor 626 in the email authorization system 404. In some embodiments, the actions in the workflow may be performed in different orders and/or with different, fewer or additional actions than those illustrated in FIG. 25. Multiple actions can be combined in some implementations.

FIG. 25 includes workflow 2500 that begins at step S25.1 when a recipient 2204 of a cold email validated by the email authorization system 404 sends a response back to the sender of the cold email. The email is delivered to the email channel of the email account 2504 associated with the email source 2202 which originally sent the cold email. The response is saved in a message folder for the email account 2504 in the email server 2502 associated with the email source. Workflow 2500 continues at step S25.2 when the new response processor 626 accesses the email account 2504 information in the registered email account database 604. At step S25.3, the new response processor 626 accesses the email account 2504 hosted by the email server 2502 with the email account information retrieved at step S25.2 and checks for a response to the sent cold email. The response from the recipient 2204 from step S25.1 is included among the new emails. A response may be identified by matching one or more identifying parameters associated with the response to identifying parameters of the originally sent cold email. The identifying parameters can include for example components in an email message header, e.g., sender email address, email address domain, IP address from which the email originated, message ID, etc. At step S25.4, the new response processor 626 creates a second blockchain address for the cold email in association with the first blockchain address of the cold email. At step S25.5, the new response processor 626 updates the information for the cold email in the cold email database 614, indicating that the recipient of the cold email has responded. At step S25.6, the new response processor 626 executes a second blockchain transaction associated with the second blockchain address through the internal wallet service 630 of the email authorization system 404, the executed second blockchain transaction including the transfer of the cryptocurrency logged in the trust account 632 in the internal wallet service 630 of the email authorization system 404 to the recipient 2204. At step S25.7, the internal wallet service 630 broadcasts the second blockchain transaction to the blockchain network 416. The second blockchain transaction is entered into the blockchain ledgers in the blockchain network 416. After the blockchain transaction is verified in a blockchain network 416, the transfer of the cryptocurrency is logged in the recipient's wallet service. In one embodiment, the recipient may use the service of an external wallet. In one embodiment, the recipient may use the internal wallet service 630 of the email authorization system 404. In one embodiment where the recipient of the cold email uses the service of the internal wallet service 630, an off-chain transaction can be executed to link the first blockchain transaction in the trust account 632 in the internal wallet service 630 to the recipient. At step S25.8, the recipient 2204 is notified of the executed second blockchain transaction.

Processing of Cold Emails in Recipient Email Inbox Folder

Figure 26:
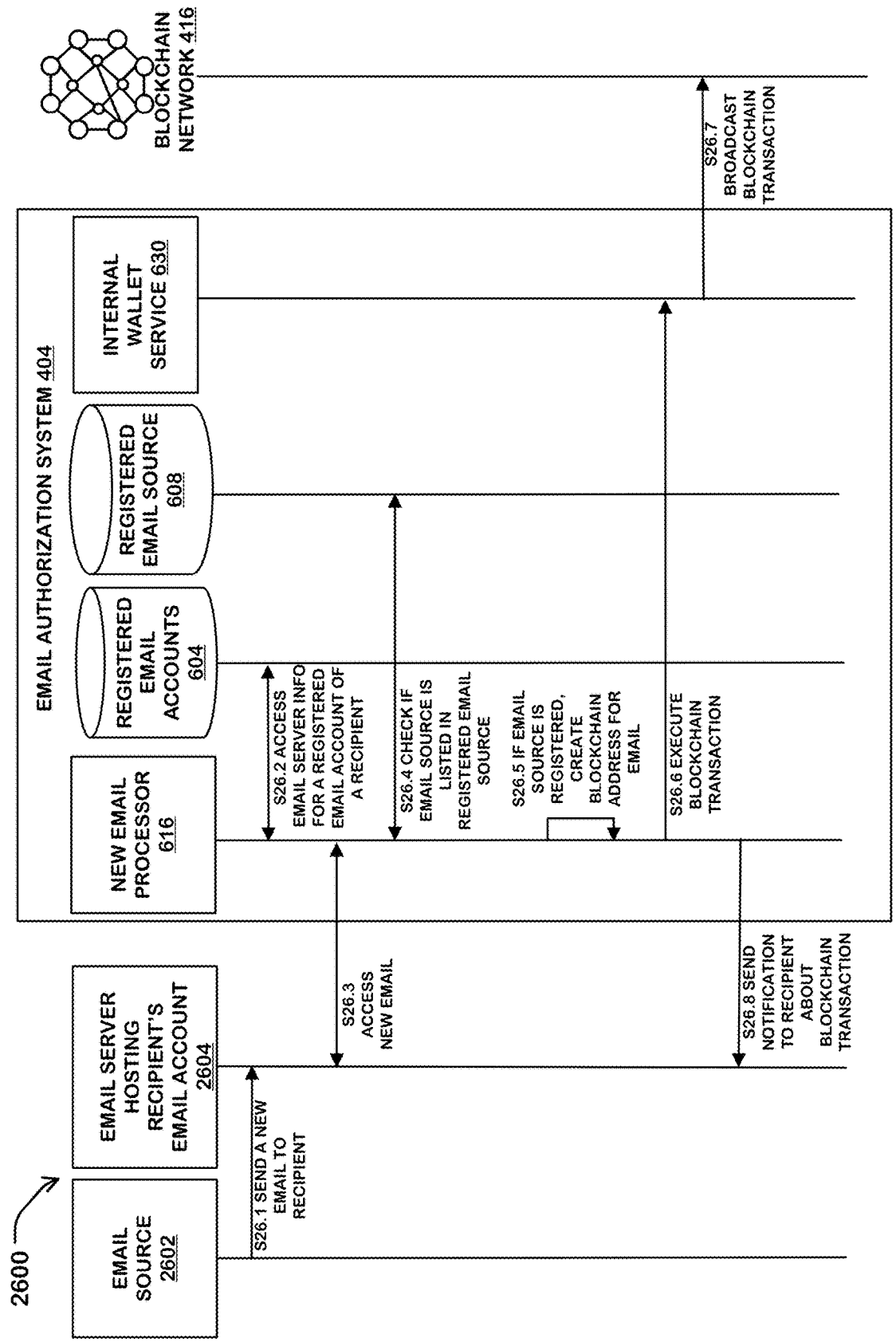
FIG. 26 is a sequence diagram illustrating a representative method of processing cold emails by the new email processor in FIG. 6.

FIG. 26 is an example workflow 2600 illustrating a representative method of processing cold emails sent by an email source 2602 by the new user processor 616 in the email authorization system 404. In some embodiments, the actions in the workflow may be performed in different orders and/or with different, fewer or additional actions than those illustrated in FIG. 26. Multiple actions can be combined in some implementations.

FIG. 26 includes workflow 2600 that begins at step S26.1 when an email source 2602 sends an email to a recipient who is an email authorization user. The email is delivered to the email channel of the recipient email account which, in some embodiments, is saved in a message folder for the recipient's email account on the email server 2604. Workflow 2600 continues at step S26.2 when the new email processor 620 accesses recipient's email account information in the registered email account database 604. At step S26.3, the new email processor 620 accesses the recipient email account hosted by the email server 2604 with the email account information retrieved at step S26.2. The email from the email source 2602 from step S26.1 is included among the new emails. At step S26.4, the new email processor 620 checks whether the email source is listed in the registered email source database 608. As the email source is registered in the registered email source database 608, the new email processor 620 creates a new blockchain address for the email at step S26.5. At step S26.6, the new email processor 620 executes a blockchain transaction associated with the blockchain address through a wallet account associated with the email source in the internal wallet service 630 in the email authorization system 404, the executed blockchain transaction including the transfer of the cryptocurrency from the wallet account associated with the email source 2602 in the internal wallet service 630 of the email authorization system 404 to the recipient. At step S26.7, the internal wallet service 630 broadcasts the blockchain transaction to the blockchain network 416. The blockchain transaction is entered into the blockchain ledgers in the blockchain network 416. After the blockchain transaction is verified in a blockchain network 416, the transfer of the cryptocurrency is logged in the recipient's wallet service. In one embodiment, the recipient may use the service of an external wallet. In one embodiment, the recipient may use the internal wallet service 630 of the email authorization system 404. At step S26.8, the recipient is notified of the executed blockchain transaction. In one embodiment where the recipient of the cold email and the email source use the service of the internal wallet service 630, an off-chain transaction can be executed to transfer the cryptocurrency to the recipient.

Email Authorization System Scheduler

Figure 27:
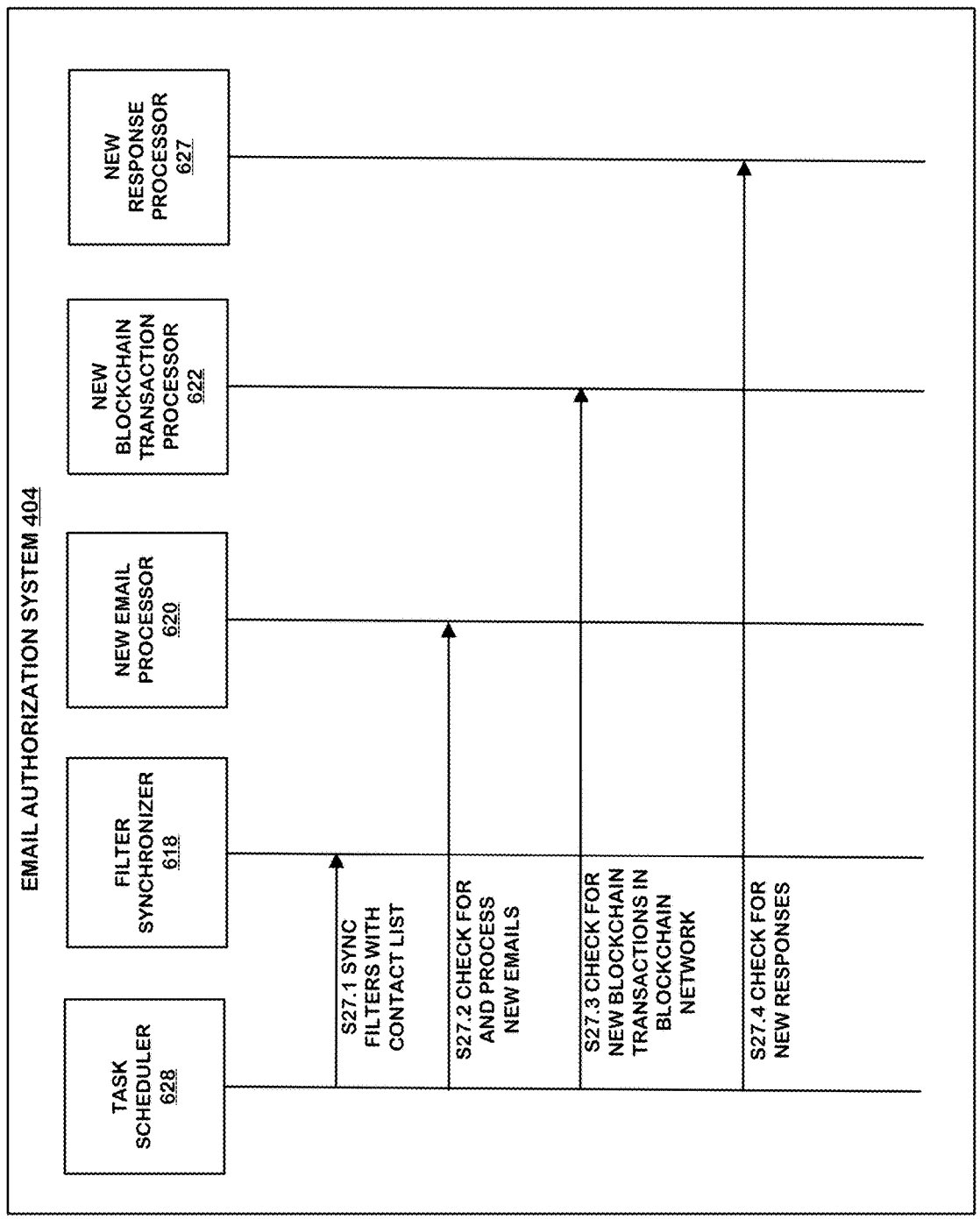
FIG. 27 is a sequence diagram illustrating a representative method of scheduling various tasks in the email authorization system by the task scheduler in FIG. 6.

FIG. 27 is an example workflow 2700 illustrating a representative method of scheduling various tasks by the task scheduler 628 in the email authorization system 404. In some embodiments, the actions in the workflow may be performed in different orders and/or with different, fewer or additional actions than those illustrated in FIG. 27. Multiple actions can be combined in some implementations.

In the workflow 2700, the task scheduler 628 schedules various tasks in the email authorization system 404, such as requesting the filter synchronizer 618 update the filter of each email authorization system user by checking for new contacts in user's contact list and email history maintained in user's email account (step S27.1), requesting the new email processor 620 to check for new emails in each email authorization system user's email account (step S27.2), requesting the new blockchain transaction processor 622 to check for new blockchain transactions in the blockchain network 416 (step S27.3), and requesting the new response processor 627 to check for new responses to cold emails in each email account associated with a registered email source (step S27.4). In some embodiments, the task scheduler 628 will request the filter synchronizer 618 to sync user's filter every six hours. In some embodiments, the task scheduler 628 will request the new email processor 620 and the new response processor 627 to check for new emails every fifteen minutes. In some embodiments, the task scheduler 628 will request the new blockchain transaction processor 622 to check for new blockchain transactions in the blockchain network 416 every fifteen minutes.

Blockchain Transaction Block

Figure 28A:
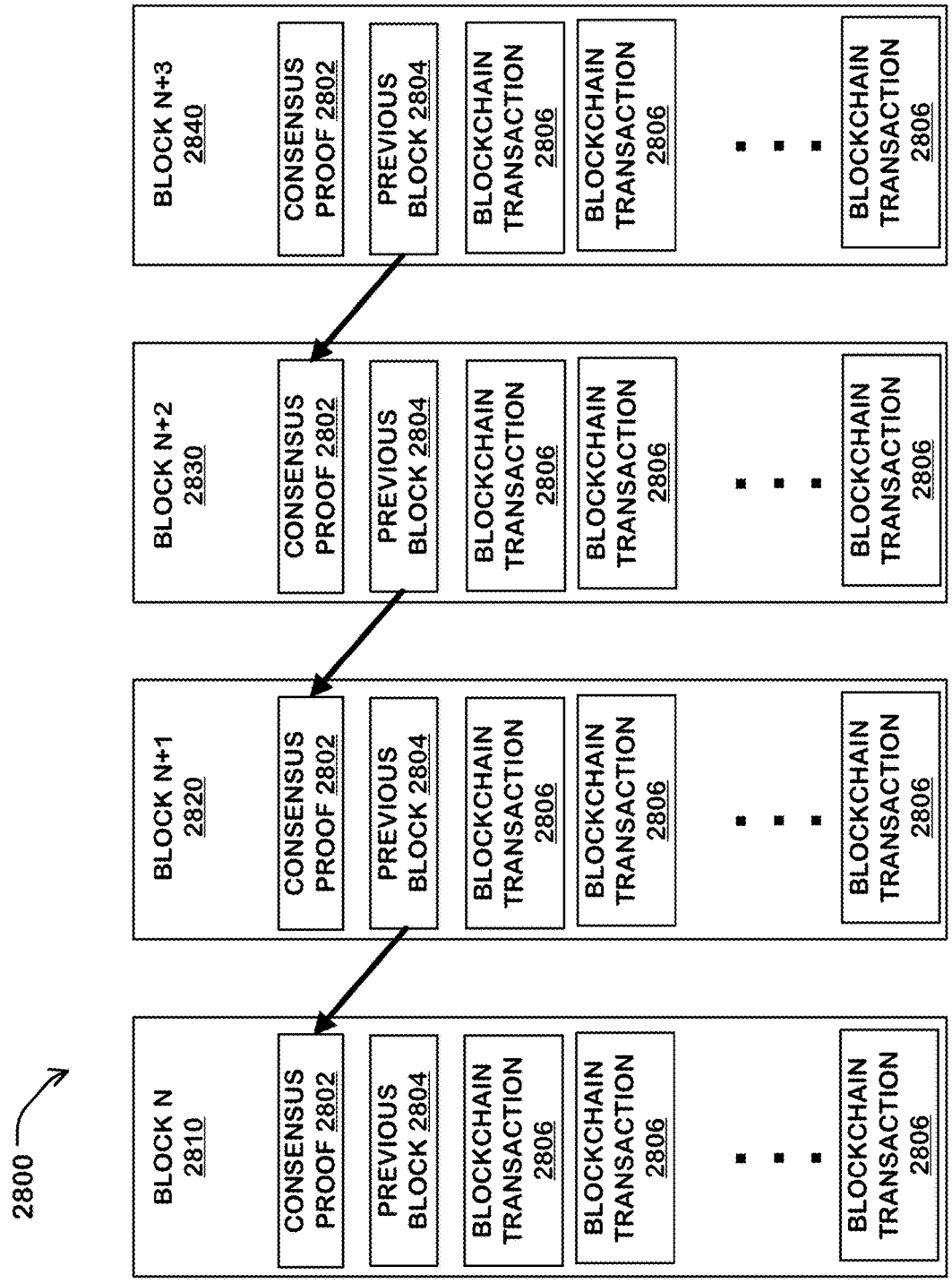

Blockchain network 416 is maintained by a network of nodes where every node executes and records the same blockchain transactions. Each node in the blockchain network 416 includes one or more distributed blockchain ledger data structure comprising a chain of blocks or "blockchain." This blockchain ledger data structure is replicated among the nodes in the blockchain network 416. FIG. 28A illustrates a segment of such a blockchain ledger data structure 2800, consisting of blocks 2810, 2820, 2830 and 2840. For the sake of clarity, only four blocks are included in FIG. 28A. Any number of blocks can be present in a blockchain structure.

Blockchain transactions 2806 are time-stamped and bundled into blocks where each block is identified by its cryptographic hash called the consensus proof 2802. The consensus proof can be determined by a consensus algorithm. Consensus algorithms that can be used for techniques described herein are the proof-of-stake algorithm (PoS), the practical Byzantine fault tolerance algorithm (PBFT), the proof-of-work algorithm (PoW), the delegated proof-of-stake algorithm (DPoS), the proof-of-authority algorithm (PoA) and the proof-of-importance algorithm (PoI). One skilled in the art would appreciate that, in other implementations, the consensus proof can be determined by any consensus algorithm.

The blocks 2810, 2820, 2830, 2840 form a sequence where each block references the consensus proof of the previous or parent block 2804, forming a chain of blocks. In some embodiments, a special data structure called a Merkle tree is used to store the blockchain transactions.

New blocks can be created and added to the blockchain in a process called mining. The nodes in the blockchain network 416 that perform the mining operations are called miners or stakers. New blockchain transactions are broadcast to all the nodes on the network. Each miner node creates its own block by collecting the new blockchain transactions and then finds a consensus proof for its block by performing complex cryptographic computations. The miners validate the blockchain transactions and reach a consensus on the block that should be added next to the blockchain. The newly mined block, called the winning block, is then broadcast to the entire network.

Blockchain is an immutable and durable data structure which maintains a record of the blockchain transactions that are tamper-resistant. Once a blockchain transaction is recorded in a block, it cannot be altered or deleted as long as a majority of the computational power of the network is not controlled by peers who collude to alter the blockchain.

While each miner on the blockchain network 416 can create its own block, only the block which has a consensus proof of a given difficulty is accepted to be added to the blockchain. The consensus mechanism ensures that all the nodes agree on the same block to contain the canonical blockchain transactions. Blockchain offers enhanced security as compared to centralized systems as every transaction is verified by multiple miners. The integrity of the transaction data recorded in the blocks is protected through strong cryptography. In addition to the transaction data, each block contains a consensus proof of itself and the consensus proof of the previous block. Any attempts to modify a transaction would result in a change in the consensus proof and would require all the subsequent blocks to be recomputed. This would be extremely difficult to achieve as long as the majority of miners do not cooperate to attack the network.

Figure 28B:
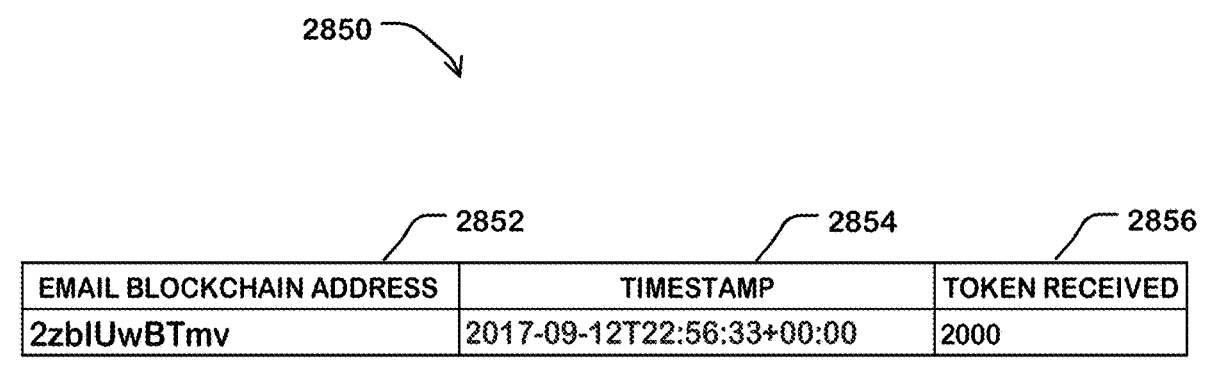

FIG. 28B illustrates an example blockchain transaction block 2850 located in block 2810 that implements the technology disclosed. The blockchain transaction block 2850 includes a the blockchain address 2852 associated with the blockchain transaction, a timestamp 2854 to record the time and date the blockchain transaction was completed, and the amount of tokens received 2856. The blockchain transaction block 2850 can also include other components which are not shown in FIG. 28B, such as header, nonce, balance, storage root, code hash, value, signature, ommers hash, beneficiary, state root, transactions root, receipts root, logs bloom, difficulty, number, private key, public key, extra data, and mix hash. One skilled in the art would appreciate that, in other implementations, the blockchain transaction block 2850 shown in FIG. 28B can be distributed across multiple blockchain ledgers in blockchain nodes in the blockchain network 416.

A number of workflows illustrating logic are described herein. The logic can be implemented using processors programmed using computer programs stored in memory accessible to the computer systems and executable by the processors. With all workflows herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a re-arrangement of steps will achieve the same results only if certain conditions are satisfied. Furthermore, it will be appreciated that the workflows herein show only steps that are pertinent to an understanding of the invention, and it will be understood that numerous additional steps for accomplishing other functions can be performed before, after and between those shown.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing descriptions, it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for handling email, comprising:
   receiving using a server a request to send an email from an email source addressed to a recipient email address;
   maintaining in memory accessible by a server, a first blockchain address associated with an email source;
   enabling sending of the email to an email inbox folder in an email channel of the recipient email address;
   processing emails from the email recipient address to identify a response to the enabled email;
   after identification of the response to the enabled email, executing a transaction associated with the first blockchain address;
   monitoring an email channel of the recipient email address to select emails addressed to recipient email addresses using filters associated with respective recipient email addresses, the filters including information identifying parameters associated with pre-authorized emails for the respective email addresses;
   for emails selected using the filters, establishing individual blockchain addresses for particular selected emails, and returning messages to senders of the particular emails selected using the filters prompting execution of blockchain transactions using the individual blockchain addresses, the prompted blockchain transactions having specified characteristics required for authorization of the particular emails selected using the filters;
   authorizing the particular emails selected using the filters and the enabled email to recipient email addresses upon detection of a transaction in a blockchain network of the prompted blockchain transactions, and verification of the specified characteristics of the prompted blockchain transactions; and blocking emails other than the emails selected using the filters and the enabled email from email inboxes of the recipient email addresses.

2. The method of claim 1, wherein executing a transaction includes determining a second blockchain address associated with the recipient email address, and executing a blockchain transaction using the second blockchain address and the first blockchain address.

3. The method of claim 1, including maintaining a record of account associated with the recipient email address, and wherein executing a transaction includes linking the first blockchain address and an encryption key for the first blockchain transaction in the record of account.

4. The method of claim 1, wherein the first blockchain address identifies a first blockchain transaction authorized by the email source.

5. The method of claim 1, wherein said processing emails from the email recipient address includes monitoring an email channel of the email source.

6. The method of claim 5, wherein said monitoring the email channel includes traversing email inbox folders of the email source.

7. The method of claim 1, wherein the request to send an email includes a request email from the email source carries a sender message ID, and the response carries a response message ID and the sender message ID, and said processing emails from the email recipient address includes matching the sender message ID of the email to the sender message ID carried in the response.

8. The method of claim 1, including maintaining a list of registered email source accounts, further including maintaining in memory lists of associated encryption keys of the registered email source accounts.

9. The method of claim 1, including composing a first notification to be sent to the recipient email address, informing the recipient that after the recipient responds to the email, the transaction will be executed.

10. The method of claim 1, including composing a second notification to be sent to the recipient email address, informing the recipient of completion of the second blockchain transaction.

11. The method of claim 1, wherein the first blockchain address maps to a token stored in a blockchain transaction, and the transaction includes transfer of the token.

12. The method of claim 1, wherein the first blockchain transaction comprises a transfer of cryptocurrency having a specified monetary value.

13. The method of claim 1, wherein request to send the email includes metadata identifying characteristics of the first blockchain transaction.

14. The method of claim 13, wherein said processing the email includes executing a first blockchain transaction using the first blockchain address having the characteristics identified in the metadata.

15. The method of claim 1, wherein said processing the email includes returning a message to the email source including a link to a user interface for tools useable to cause execution of a first blockchain transaction using the first blockchain address.

16. A system, comprising:
one or more network nodes, where a network node of the one or more network nodes includes a communication interface, a processor or processors and memory accessible by the processor or processors;
the one or more network nodes configured for execution of a procedure for handling emails, comprising:
receiving using a server a request to send an email from an email source addressed to a recipient email address;
maintaining in memory accessible by a server, a first blockchain address associated with an email source;
enabling sending of the email to an email inbox folder in an email channel of the recipient email address;
processing emails from the email recipient address to identify a response to the enabled email;
after identification of the response to the enabled email, executing a transaction associated with the first blockchain address;
monitoring an email channel of the recipient email address to select emails addressed to recipient email addresses using filters associated with respective recipient email addresses, the filters including information identifying parameters associated with pre-authorized emails for the respective email addresses;
for emails selected using the filters, establishing individual blockchain addresses for particular selected emails, and returning messages to senders of the particular emails selected using the filters prompting execution of blockchain transactions using the individual blockchain addresses, the prompted blockchain transactions having specified characteristics required for authorization of the particular emails selected using the filters;
authorizing the particular emails selected using the filters and the enabled email to recipient email addresses upon detection of a transaction in a blockchain network of the prompted blockchain transactions, and verification of the specified characteristics of the prompted blockchain transactions; and
blocking emails other than the emails selected using the filters and the enabled email from email inboxes of the recipient email addresses.

17. The system of claim 16, wherein executing a transaction includes determining a second blockchain address associated with the recipient email address, and executing a blockchain transaction using the second blockchain address and the first blockchain address.

18. The system of claim 16, including maintaining a record of account associated with the recipient email address, and wherein executing a transaction includes linking the first blockchain address and an encryption key for the first blockchain transaction in the record of account.

19. The system of claim 16, wherein the first blockchain address identifies an a first blockchain transaction authorized by the email source.

20. The system of claim 16, wherein said processing emails from the email recipient address includes monitoring an email channel of the email source.

21. The system of claim 20, wherein said monitoring the email channel includes traversing email inbox folders of the email source.

22. The system of claim 16, wherein the request to send an email includes a request email from the email source which carries a sender message ID, and the response carries a response message ID and the sender message ID, and said processing emails from the email recipient address include matching the sender message ID of the email to the sender message ID carried in the response.

23. The system of claim 16, including maintaining a list of registered email source accounts, further including maintaining in memory lists of associated encryption keys of the registered email source accounts.

24. The system of claim 16, including composing a first notification to be sent to the recipient email address, informing the recipient that after the recipient responds to the email, the second blockchain transaction will be executed.

25. The system of claim 16, including composing a second notification to be sent to the recipient email address, informing the recipient of completion of the transaction.

26. The system of claim 16, wherein the first blockchain address maps to a token stored in a blockchain transaction, and the transaction includes transfer of the token.

27. The system of claim 16, wherein the first blockchain transaction comprises a transfer of cryptocurrency having a specified monetary value.

28. The system of claim 16, wherein the request to send the email includes metadata identifying characteristics of the first blockchain transaction.

29. The system of claim 28, wherein said processing the email includes executing a first blockchain transaction using the first blockchain address having the characteristics identified in the metadata.

30. The system of claim 16, wherein said processing the email includes returning a message to the email source including a link to a user interface for tools useable to cause execution of a first blockchain transaction using the first blockchain address.

31. A computer program product, comprising: non-transitory machine readable memory;
a computer program stored in the memory, the computer program including instructions configured for execution of a procedure for handling emails, comprising:
receiving using a server a request to send an email from an email source addressed to a recipient email address;
maintaining in memory accessible by a server, a first blockchain address associated with an email source;
enabling sending of the email to an email inbox folder in an email channel of the recipient email address;
processing emails from the email recipient address to identify a response to the enabled email;
after identification of the response to the enabled email, executing a transaction associated with the first blockchain address;
monitoring an email channel of the recipient email address to select emails addressed to recipient email addresses using filters associated with respective recipient email addresses, the filters including information identifying parameters associated with pre-authorized emails for the respective email addresses;
for emails selected using the filters, establishing individual blockchain addresses for particular selected emails, and returning messages to senders of the particular emails selected using the filters prompting execution of blockchain transactions using the individual blockchain addresses, the prompted blockchain transactions having specified characteristics required for authorization of the particular emails selected using the filters;
authorizing the particular emails selected using the filters and the enabled email to recipient email addresses upon detection of a transaction in a blockchain network of the prompted blockchain transactions, and verification of the specified characteristics of the prompted blockchain transactions; and blocking emails other than the emails selected using the filters and the enabled email from email inboxes of the recipient email addresses.

32. The computer program product of claim 31, wherein executing a transaction includes determining a second blockchain address associated with the recipient email address, and executing a blockchain transaction using the second blockchain address and the first blockchain address.

33. The computer program product of claim 31, including maintaining a record of account associated with the recipient email address, and wherein executing a transaction includes linking the first blockchain address and an encryption key for the first blockchain transaction in the record of account.

34. The computer program product of claim 31, wherein the first blockchain address identifies a first blockchain transaction authorized by the email source.

35. The computer program product of claim 31, wherein said processing emails from the email recipient address includes monitoring an email channel of the email source.

36. The computer program product of claim 35, wherein said monitoring the email channel includes traversing email inbox folders of the email source.

37. The computer program product of claim 31, wherein the request to send an email includes a request email from the email source carries a sender message ID, and the response carries a response message ID and the sender message ID, and said processing emails from the email recipient address includes matching the sender message ID of the email to the sender message ID carried in the response.

38. The computer program product of claim 31, including maintaining a list of registered email source accounts, further including maintaining in memory lists of associated encryption keys of the registered email source accounts.

39. The computer program product of claim 31, including composing a first notification to be sent to the recipient email address, informing the recipient that after the recipient responds to the email, the transaction will be executed.

40. The computer program product of claim 31, including composing a second notification to be sent to the recipient email address, informing the recipient of completion of the transaction.

41. The computer program product of claim 31, wherein the first blockchain address maps to a token stored in a blockchain transaction, and the transaction includes transfer of the token.

42. The computer program product of claim 31, wherein the first blockchain transaction comprises a transfer of cryptocurrency having a specified monetary value.

43. The computer program product of claim 31, wherein the request to send the email includes metadata identifying characteristics of the first blockchain transaction.

44. The computer program product of claim 43, wherein said processing the email includes executing a first blockchain transaction using the first blockchain address having the characteristics identified in the metadata.

45. The computer program product of claim 31, wherein said processing the email includes returning a message to the email source including a link to a user interface for tools useable to cause execution of a first blockchain transaction using the first blockchain address.

\* \* \* \* \*